(12) United States Patent
Gandhe et al.

(10) Patent No.: US 10,121,467 B1
(45) Date of Patent: Nov. 6, 2018

(54) AUTOMATIC SPEECH RECOGNITION INCORPORATING WORD USAGE INFORMATION

(71) Applicant: Amazon Technologies, Inc., Seattle, WA (US)

(72) Inventors: Ankur Gandhe, Seattle, WA (US); Denis Sergeyevich Filimonov, Seattle, WA (US); Ariya Rastrow, Seattle, WA (US); Björn Hoffmeister, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/197,923

(22) Filed: Jun. 30, 2016

(51) Int. Cl.
*G10L 15/06* (2013.01)
*G10L 15/183* (2013.01)
*G10L 15/16* (2006.01)
*G10L 15/197* (2013.01)

(52) U.S. Cl.
CPC ............ *G10L 15/063* (2013.01); *G10L 15/16* (2013.01); *G10L 15/183* (2013.01); *G10L 15/197* (2013.01)

(58) Field of Classification Search
CPC ....... G10L 15/06; G10L 15/193; G10L 15/00; G10L 15/01; G10L 15/02; G10L 15/063; G10L 15/08; G10L 15/083; G10L 15/10; G10L 15/12; G10L 15/14; G10L 15/142; G10L 15/16; G10L 15/18; G10L 15/187; G10L 15/19; G10L 15/197; G10L 15/26
USPC .......... 704/10, 1, 3, 243, 231, 235, 251, 257
See application file for complete search history.

(56) References Cited

U.S. PATENT DOCUMENTS

| | | | | |
|---|---|---|---|---|
| 2014/0236578 | A1* | 8/2014 | Malon | G06F 17/28 704/9 |
| 2014/0303973 | A1* | 10/2014 | Amarilli | G10L 15/08 704/235 |
| 2017/0162203 | A1* | 6/2017 | Huang | G10L 15/285 |

* cited by examiner

*Primary Examiner* — Qi Han
(74) *Attorney, Agent, or Firm* — Pierce Atwood LLP

(57) ABSTRACT

A language model for automatic speech processing, such as a finite state transducer (FST) may be configured to incorporate information about how a particular word sequence (N-gram) may be used in a similar manner from another N-gram. A score of a component of the FST (such as an arc or state) relating to the first N-gram may be based on information of the second N-gram. Further, the FST may be configured to have an arc between a state of the first N-gram and a state of the second N-gram to allow for cross N-gram back off, rather than backoff from a larger N-gram to a smaller N-gram during traversal of the FST during speech processing.

16 Claims, 17 Drawing Sheets

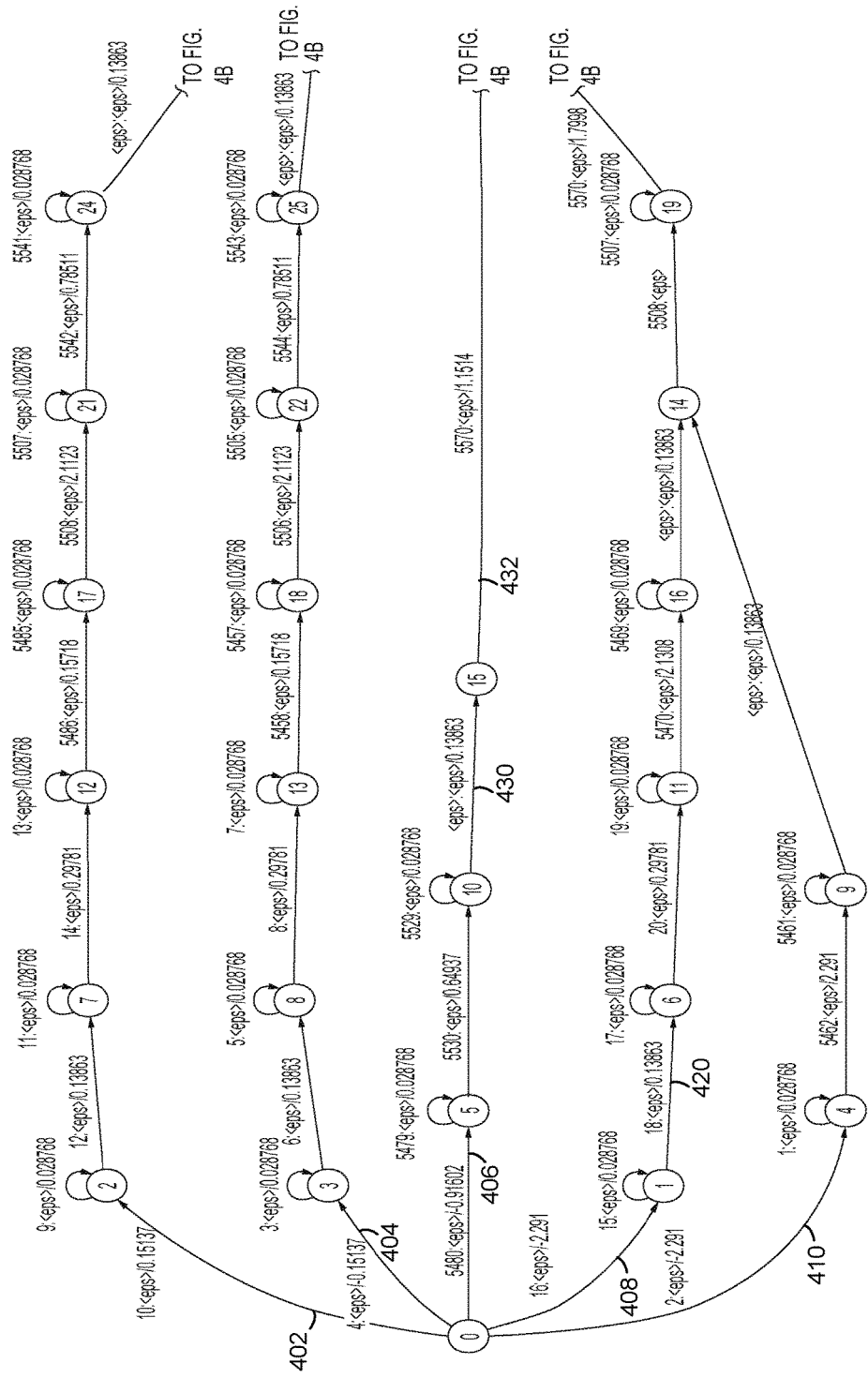

AUTOMATIC SPEECH RECOGNITION INCORPORATING WORD USAGE INFORMATION

BACKGROUND

Speech recognition systems have progressed to the point where humans can interact with computing devices relying on speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also convert a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 4A-4D illustrate a section of a finite state transducer according to embodiments of the present disclosure.

DETAILED DESCRIPTION

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system.

ASR and NLU can be computationally expensive. That is, significant computing resources may be needed to process ASR and NLU processing within a reasonable time frame. Because of this, a distributed computing environment may be used to when performing speech processing. An example of such a distributed environment may involve a local device having one or more microphones being configured to capture sounds from a user speaking (e.g., "utterances") and convert those sounds into data (e.g., "an audio signal"). The audio signal/data may then be sent to a downstream remote device for further processing, such as converting the audio signal into an ultimate command. The command may then be executed by a combination of remote and local devices depending on the command itself.

Finite State Transducers (FSTs) and other language models are widely used in ASR systems to encode different knowledge sources used during search. A language model is a model that indicates how likely certain words are used together, as based on many different example sentences and text available to the system. Such language models may encode a representation of how likely such words or word combinations are likely to be used by a speaker, thus assisting an ASR system in determining the likelihood that a certain word was spoken during an utterance being processed. Such language models are used with acoustic models (that are used to determine a likelihood that a certain detected sound corresponds to a particular acoustic unit) to transform audio data into text.

One potential drawback to current language models, in particular FST language models, is that a universe of text samples used to create the language model may not completely represent the different word combinations that may be spoken by a user. This may result in undesirable performance at runtime when an input utterance includes a word sequence not previously encountered when training the language model.

To improve system performance, a new language model (such as an FST) may be constructed where a score corresponding to a first word sequence (called an N-gram) is adjusted (e.g., increased) based on the score corresponding to a second N-gram, where the first N-gram and second N-gram have been determined to be similar. Further, links between the first and second N-gram may be built in to the language model so the system may take advantage of their similarity during runtime.

Figure 1:
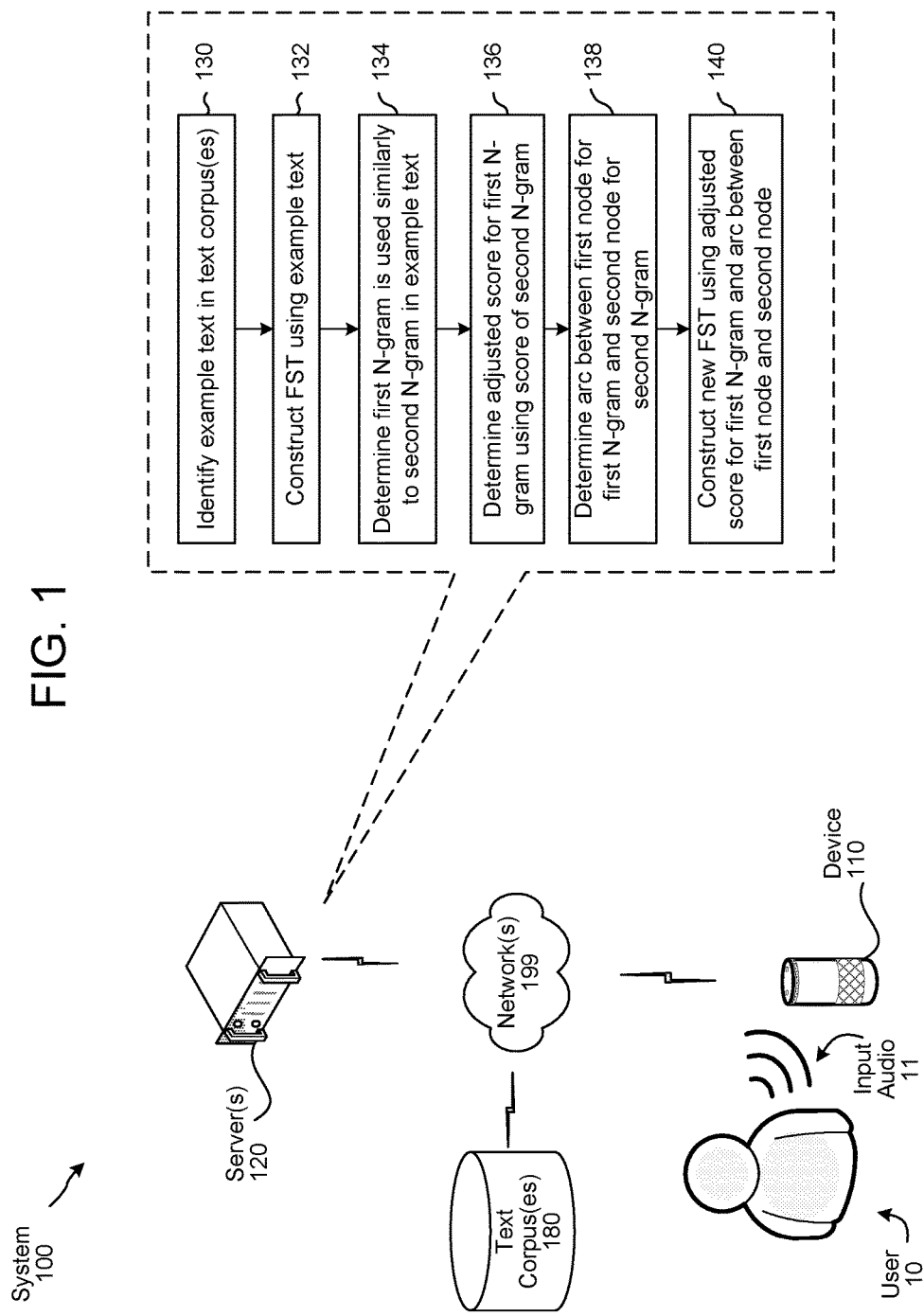
FIG. 1 illustrates a system for creating and using finite state transducers (FSTs) that incorporate word usage information in an automatic speech recognition (ASR) system according to embodiments of the present disclosure.

FIG. 1 shows a system 100 configured to perform adaptive beam pruning in an ASR system. Although FIG. 1, and lower figures/discussion, illustrate the operation of the system in a particular order, the steps described may be performed in a different order (as well as certain steps removed or added) without departing from the intent of the disclosure. As shown in FIG. 1, a system 100 may include one or more devices 110 local to user(s) 10 (which may be referred to as a local device), as well as one or more networks 199 and one or more servers 120 connected to device 110 across network(s) 199. The server(s) 120 (which may be one or more different physical devices) may be capable of performing traditional speech processing (such as ASR, NLU, query parsing, etc.) as described herein. A single server may be capable of performing all speech processing or multiple server(s) 120 may combine to perform the speech processing. Further, the server(s) 120 may be configured to execute certain commands, such as answering queries spoken by user 10. In addition, certain speech detection or command execution functions may be performed by device 110.

As shown in FIG. 1, the system may identify (130) example text in one or more text corpuses 180. The text corpus(es) 180 may include web sources, stored example sentences, or other textual examples of sentences that a user might speak. The system may take those textual examples to create a language model to assist in ASR processing to estimate what words correspond to the sounds of input audio data. For example, the system may construct (132) an FST using the example text. The FST may include states/nodes and arcs (as described below) whose scores are based on how often certain words and/or word combinations appear in the text corpus(es) 180. The system may determine (134) that a first N-gram is used similarly to a second N-gram in the example text. This may be done, as described further below, by comparing the distance (i.e., difference) between vectors describing characteristics of each N-gram. With the information that the two N-grams are similar, the system may determine (136) an adjusted score for the first N-gram using the score of the second N-gram. That is, the adjusted score of the first N-gram may be determined by adding the old score of the first N-gram to the score of the second N-gram. Or the adjusted score of the first N-gram may be determined by adding the old score of the first N-gram to a weighted score of the second N-gram, where the score of the second N-gram is weighted based on how similar the first N-gram is to the second N-gram. The adjusted score of the first N-gram may also be normalized. That adjusted score may replace the old score in a new FST. The system may also determine (138) a new arc between a first node of the FST (where the first node represents the first N-gram) and a second node of the FST (where the second node represents the second N-gram). The new arc may be given a score based on the similarity of the first N-gram to the second N-gram. The system may then construct (140) a new FST using the adjusted score corresponding to the first N-gram as well as the new arc between the first node and the second node.

Figure 2:
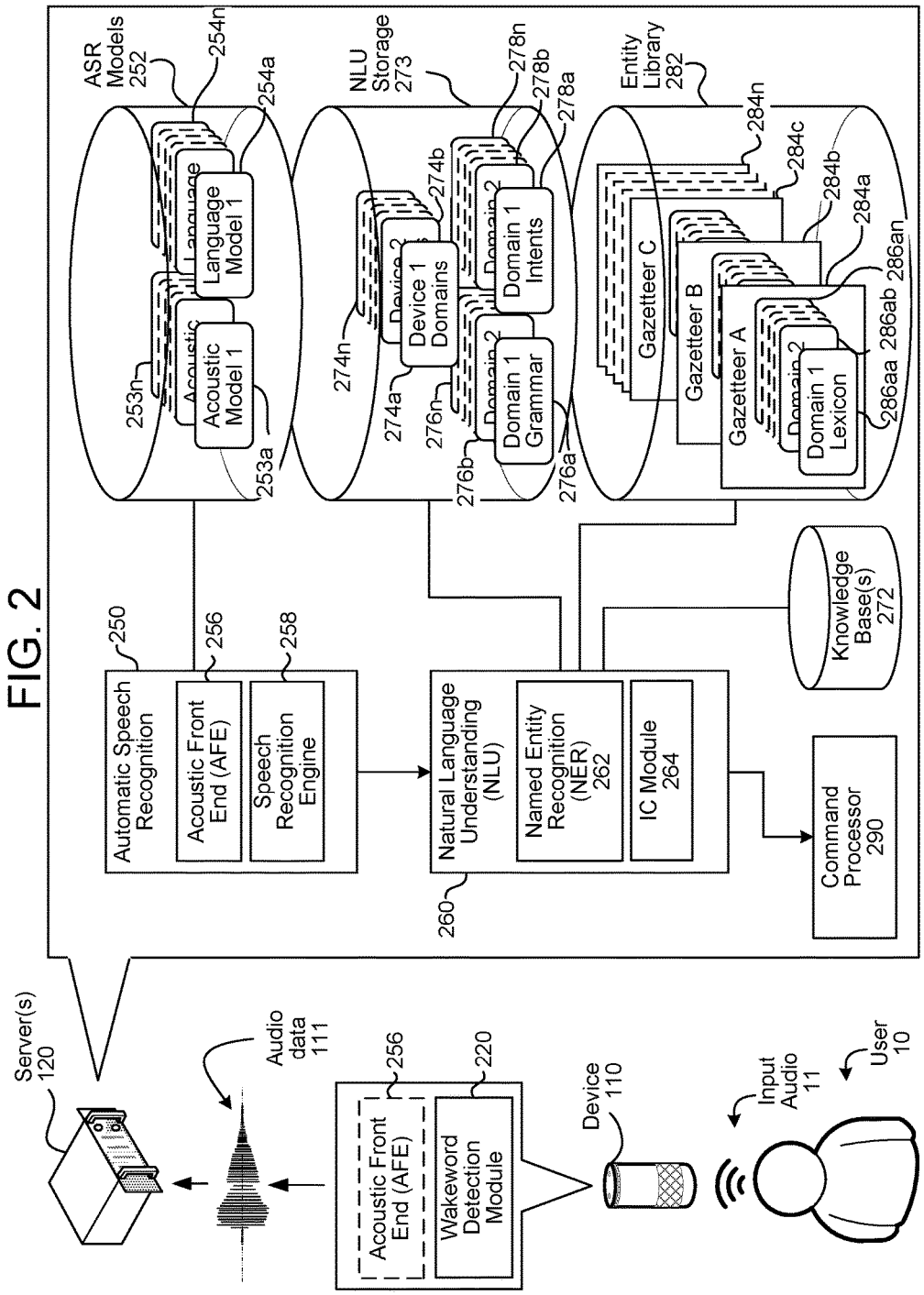
FIG. 2 is a conceptual diagram of a speech processing system according to embodiments of the present disclosure.

Further details are discussed below, following a discussion of the overall speech processing system of FIG. 2. FIG. 2 is a conceptual diagram of how a spoken utterance is traditionally processed, allowing a system to capture and execute commands spoken by a user, such as spoken commands that may follow a wakeword. The various components illustrated may be located on a same or different physical devices. Communication between various components illustrated in FIG. 2 may occur directly or across a network 199. An audio capture component, such as a microphone of device 110, captures audio 11 corresponding to a spoken utterance. The device 110, using a wakeword detection module 220, then processes the audio, or audio data corresponding to the audio, to determine if a keyword (such as a wakeword) is detected in the audio. Following detection of a wakeword, the device sends audio data 111 corresponding to the utterance, to a server 120 that includes an ASR module 250. The audio data 111 may be output from an acoustic front end (AFE) 256 located on the device 110 prior to transmission. Or the audio data 111 may be in a different form for processing by a remote AFE 256, such as the AFE 256 located with the ASR module 250.

The wakeword detection module 220 works in conjunction with other components of the device, for example a microphone (not pictured) to detect keywords in audio 11. For example, the device 110 may convert audio 11 into audio data, and process the audio data with the wakeword detection module 220 to determine whether speech is detected, and if so, if the audio data comprising speech matches an audio signature and/or model corresponding to a particular keyword.

The device 110 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM), Gaussian Mixture Model (GMM) or Deep Neural Network (DNN) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the device 110 (or separately from speech detection), the device 110 may use the wakeword detection module 220 to perform wakeword detection to determine when a user intends to speak a command to the device 110. This process may also be referred to as keyword detection, with the wakeword being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 220 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting uses hidden Markov models (HMM) for each key wakeword word and non-wakeword speech signals respectively. The non-wakeword speech includes other spoken words, background noise etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Classifiers or other machine learning techniques may also be used. Wakeword detection may also be configured to operate in stages where different stages use different approaches. Other techniques for wakeword detection, such as those known in the art, may also be used.

Once the wakeword is detected, the local device 110 may "wake" and begin transmitting audio data 111 corresponding to input audio 11 to the server(s) 120 for speech processing. Audio data corresponding to that audio may be sent to a server 120 for routing to a recipient device or may be sent to the server for speech processing for interpretation of the included speech (either for purposes of enabling voice-communications and/or for purposes of executing a command in the speech). The audio data 111 may include data corresponding to the wakeword, or the portion of the audio data corresponding to the wakeword may be removed by the local device 110 prior to sending. Further, a local device 110 may "wake" upon detection of speech/spoken audio above a threshold, as described herein. Upon receipt by the server(s) 120, an ASR module 250 may convert the audio data 111 into text. The ASR transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 254 stored in an ASR model storage 252c. For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 256 and a ASR engine 258. The acoustic front end (AFE) 256 transforms the audio data from the microphone into data for processing by the speech recognition engine. The ASR engine 258 compares the speech recognition data with acoustic models 253, language models 254, and/or other data models and information for recognizing the speech conveyed in the audio data. The AFE may reduce noise in the audio data and divide the digitized audio data into frames representing a time intervals for which the AFE determines a number of values, called features, representing the qualities of the audio data, along with a set of those values, called a feature vector, representing the features/qualities of the audio data within the frame. Typically audio frames may be 10 ms each. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The ASR engine 258 may process the output from the AFE 256 with reference to information stored in speech/model storage (252). Alternatively, post front-end processed data (such as feature vectors) may be received by the device executing ASR processing from another source besides the internal AFE. For example, the device 110 may process audio data into feature vectors (for example using an on-device AFE 256) and transmit that information to a server across a network 199 for ASR processing. Feature vectors may arrive at the server encoded, in which case they may be decoded prior to processing by the processor executing the ASR engine 258.

The ASR engine 258 attempts to match received feature vectors to language phonemes and words as known in the stored acoustic models 253, and language models 254. The ASR engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The ASR engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using finite state transducers (FSTs) explained below, may also be used.

Following ASR processing, the ASR results may be sent by the ASR engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as server 120, for natural language understanding (NLU) processing, such as conversion of the text into commands for execution, either by the device 110, by the server 120, or by another device (such as a server running a specific application like a search engine, etc.).

The device performing NLU processing 260 (e.g., server 120) may include various components, including potentially dedicated processor(s), memory, storage, etc. A device configured for NLU processing may include a named entity recognition (NER) module 252 and intent classification (IC) module 264, a result ranking and distribution module 266, NLU storage 273, and a knowledge base 272. The NLU process may also utilize gazetteer information (284a-284n) stored in entity library storage 282. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

The NLU process takes textual input (such as processed from ASR 250 based on the utterance 11) and attempts to make a semantic interpretation of the text. That is, the NLU process determines the meaning behind the text based on the individual words and then implements that meaning. NLU processing 260 interprets a text string to derive an intent or a desired action from the user as well as the pertinent pieces of information in the text that allow a device (e.g., device 110) to complete that action. For example, if a spoken utterance is processed using ASR 250 and outputs the text "call mom" the NLU process may determine that the user intended to activate a telephone in his/her device and to initiate a call with a contact matching the entity "mom."

The NLU may process several textual inputs related to the same utterance. For example, if the ASR 250 outputs N text segments (as part of an N-best list), the NLU may process all N outputs to obtain NLU results.

The NLU process may be configured to parse and tag text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result). Thus, certain data may be associated with the word "call" indicating that it corresponds to a command and other data may be associated with the word "mom" indicating that it corresponds to an entity.

To correctly perform NLU processing of speech input, the NLU process 260 may be configured to determine a "domain" of the utterance so as to determine and narrow down which services offered by the endpoint device (e.g., server 120 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The name entity recognition module 262 receives a query in the form of ASR results and attempts to identify relevant grammars and lexical information that may be used to construe meaning. To do so, a name entity recognition module 262 may begin by identifying potential domains that may relate to the received query. The NLU storage 273 may include a database of devices (274a-274n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, User ID, or Household ID, or some other indicator.

A domain may represent a discrete set of activities having a common theme, such as "shopping", "music", "calendaring", etc. As such, each domain may be associated with a particular language model and/or grammar database (276a-276n), a particular set of intents/actions (278a-278n), and a particular personalized lexicon (286). Each gazetteer (284a-284n) may include domain-indexed lexical information associated with a particular user and/or device. For example, the Gazetteer A (284a) includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

A query is processed applying the rules, models, and information applicable to each identified domain. For example, if a query potentially implicates both communications and music, the query will be NLU processed using the grammar models and lexical information for communications, and will be processed using the grammar models and lexical information for music. The responses based on the query produced by each set of models is scored (discussed further below), with the overall highest ranked result from all applied domains is ordinarily selected to be the correct result.

An intent classification (IC) module 264 parses the query to determine an intent or intents for each identified domain, where the intent corresponds to the action to be performed that is responsive to the query. Each domain is associated with a database (278a-278n) of words linked to intents. For example, a music intent database may link words and phrases such as "quiet," "volume off," and "mute" to a "mute" intent. The IC module 264 identifies potential intents for each identified domain by comparing words in the query to the words and phrases in the intents database 278.

In order to generate a particular interpreted response, the NER 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC module 264 are linked to domain-specific grammar frameworks (included in 276) with "slots" or "fields" to be filled. For example, if "play music" is an identified intent, a grammar (276) framework or frameworks may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER module 260 may parse the query to identify words as subject, object, verb, preposition, etc., based on grammar rules and models, prior to recognizing named entities. The identified verb may be used by the IC module 264 to identify intent, which is then used by the NER module 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 260 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 264 will determine corresponds to the "play music" intent. No determination has been made as to the meaning of "mother's little helper" and "the rolling stones," but based on grammar rules and models, it is determined that these phrase relate to the grammatical object of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the a slot/field using gazetteer information, the NER module 262 may search the database of generic words associated with the domain (in the NLU's storage 273). So for instance, if the query was "play songs by the rolling stones," after failing to determine an album name or song name called "songs" by "the rolling stones," the NER 262 may search the domain vocabulary for the word "songs." In the alternative, generic words may be checked before the gazetteer information, or both may be tried (either serially or in parallel), potentially producing two different results.

The comparison process used by the NER module 262 may classify (e.g., score) how closely a database entry compares to a tagged query word or phrase, how closely the grammatical structure of the query corresponds to the applied grammatical framework, and based on whether the database indicates a relationship between an entry and information identified to fill other slots of the framework.

The NER modules 262 may also use contextual operational rules to fill slots. For example, if a user had previously requested to pause a particular song and thereafter requested that the voice-controlled device to "please un-pause my music," the NER module 262 may apply an inference-based rule to fill a slot associated with the name of the song that the user currently wishes to play—namely the song that was playing at the time that the user requested to pause the music.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing (which may include tagged text, commands, etc.) may then be sent to a command processor 290, which may be located on a same or separate server 120 as part of system 100. The destination command processor 290 may be determined based on the NLU output. For example, if the NLU output includes a command to play music, the destination command processor 290 may be a music playing application, such as one located on device 110 or in a music playing appliance, configured to execute a music playing command. If the NLU output includes a search request, the destination command processor 290 may include a search engine processor, such as one located on a search server, configured to execute a search command.

As discussed above, during ASR processing the ASR engine 258 attempts to match received feature vectors to words or subword units. A subword unit may be a phoneme, phoneme in context, syllable, part of a syllable, syllable in context, or any other such portion of a word. The ASR engine 258 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR module outputs speech results that make sense grammatically.

The ASR engine 258 may use a number of techniques to match feature vectors to phonemes or other phonetic units, such as biphones, triphones, etc. One common technique is using Hidden Markov Models (HMMs). HMMs are used to determine probabilities that feature vectors may match phonemes. Using HMMs, a number of states are presented, in which the states together represent a potential phoneme (or other speech unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the ASR engine 258, the state may change or stay the same, based on the processing of the new feature vectors. A Viterbi algorithm may be used to find the most likely sequence of states based on the processed feature vectors.

In one example, the ASR engine 258 may receive a series of feature vectors for sound corresponding to a user saying "There is a bat in my car." The ASR engine 258 may attempt to match each feature vector with a phoneme. As new feature vectors are processed, the ASR engine 258 may determine state transitions (for example, using HMMs) to determine whether a probability of whether a state should either remain the same, or change to a new state, i.e., whether an incoming feature vector results in a state transition from one phoneme to another. As the processing continues, the ASR engine 258 continues calculating such state transition probabilities. After processing one feature vector, the speech recognition may move to the next feature vector.

Probabilities and states may be calculated using a number of techniques. For example, probabilities for each state may be calculated using a Gaussian model, Gaussian mixture model, or other technique based on the feature vectors. Techniques such as maximum likelihood estimation (MLE) may be used to estimate the probability of phoneme states.

In addition to calculating potential states for one phoneme as a potential match to a feature vector, the ASR engine 258 may also calculate potential states for other phonemes. In this manner multiple states and state transition probabilities may be calculated.

The probable states and probable state transitions calculated by the ASR engine 258 are formed into paths. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. When combining scores as part of the ASR processing, scores may be multiplied together (or combined in other ways) to reach a desired combined score or probabilities may be converted to the log domain and added to assist processing.

The ASR engine 258 may also compute scores of branches of the paths based on language models or grammars. Language modeling involves determining scores for what words are likely to be used together to form coherent words and sentences. Application of a language model may improve the likelihood that the ASR module 250 correctly interprets the speech contained in the audio data. For example, acoustic model processing returning the potential phoneme paths of "B A T", "B A D", and "B E D" may be adjusted by a language model to adjust the recognition scores of "B A T" (interpreted as the word "bat"), "B A D" (interpreted as the word "bad"), and "B E D" (interpreted as the word "bed") based on the language context of each word within the spoken utterance. The language modeling may be determined from a text corpus and may be customized for particular applications.

Figure 3:
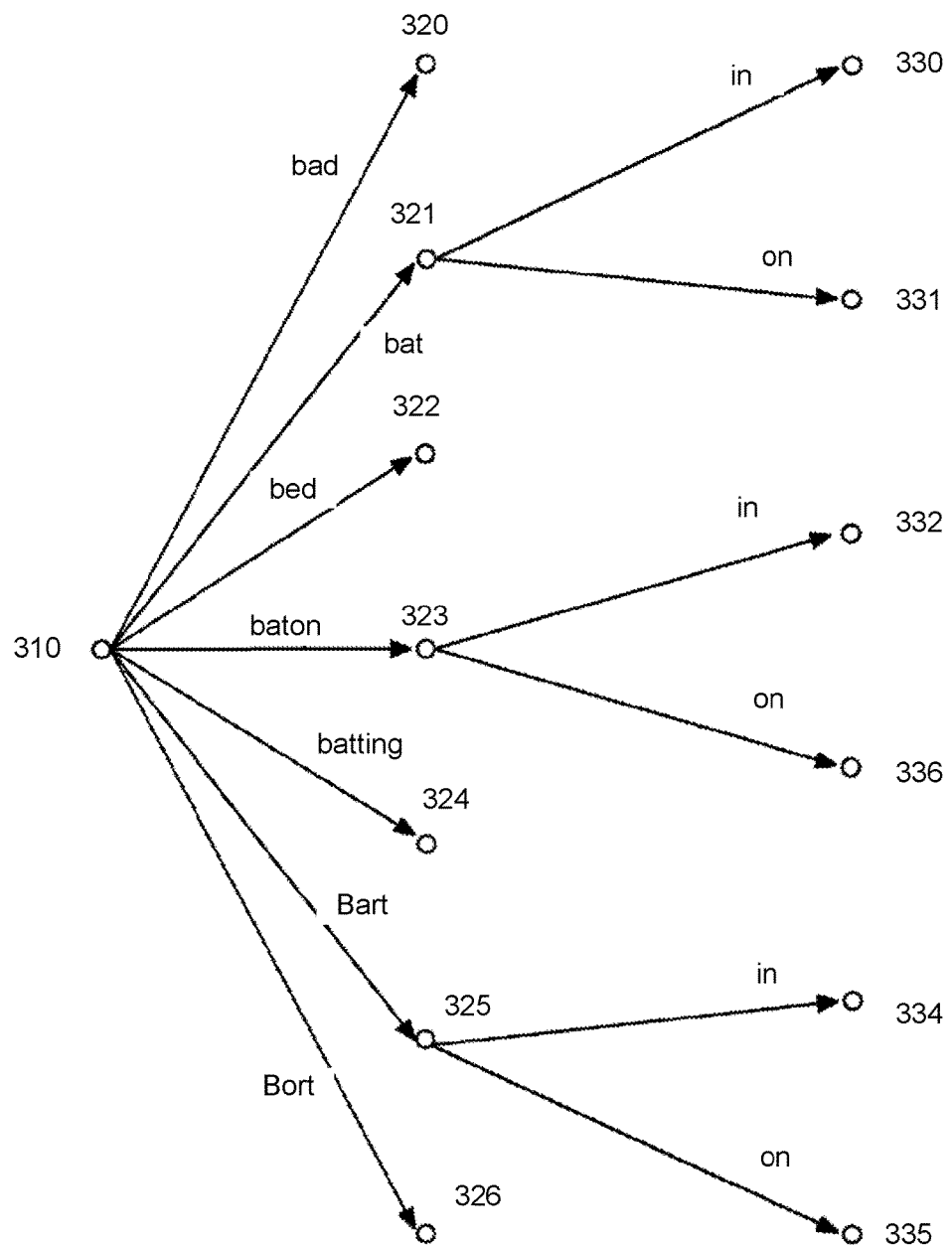
FIG. 3 illustrates a word result network according to embodiments of the present disclosure.

As the ASR engine 258 determines potential words from the input audio the lattice may become very large as many potential sounds and words are considered as potential matches for the input audio. The potential matches may be illustrated as a word result network representing possible sequences of words that may be recognized and the likelihood of each sequence. FIG. 3 shows an example of a word result network that may be used by a ASR engine 258 for recognizing speech according to some aspects of the present disclosure. A word result network may consist of sequences of words that may be recognized and the likelihood of each sequence. The likelihood of any path in the word result network may be determined by an acoustic model and a language model. In FIG. 3, the paths shown include, for example, "bad", "bat in", "bat on", "bed", "baton in", "baton on", "batting", "Bart in", "Bart on", and "Bort".

As illustrated in FIG. 3, a word result network may start at initial node 310. At node 310, no words may have been recognized yet as the ASR engine 258 commences its processing. From node 310, the ASR engine 258 may create arcs and additional nodes where each arc may be associated with a potential word that may be recognized. In some applications, words may be represented by nodes instead of arcs. In FIG. 3, arcs from node 310 to nodes 320 to 326 are labeled with example words that may be recognized by the ASR engine 258.

From initial node 310, the ASR engine 258 may apply acoustic and language models to determine which of the arcs leaving node 310 are most likely to occur. For an acoustic model employing HMMs, ASR engine 258 may create a separate HMM for each arc leaving node 310. Applying the acoustic and language models the ASR engine 258 may decide to pursue some subset of the arcs leaving node 310. For example, in FIG. 3, the ASR engine 258 may decide to follow the paths starting with "bad", "bat", and "bed" and may decide to stop pursuing the paths starting with "baton", "batting", "Bart," and "Bort" based on the respective scores of those arc, with the ASR engine 258 pursuing only the higher scoring arcs in an effort to concentrate computing resources on the arcs most likely to result in a correct result.

The ASR engine 258 may return an N-best list of paths along with their respective recognition scores, corresponding to the top N paths as determined by the ASR engine 258. An application (such as a program or component either internal or external to the ASR device 302) that receives the N-best list may then perform further operations or analysis on the list given the list and the associated recognition scores. For example, the N-best list may be used in correcting errors and training various options and processing conditions of the ASR module 250. The ASR engine 258 may compare the actual correct utterance with the best result and with other results on the N-best list to determine why incorrect recognitions received certain recognition scores. The ASR engine 258 may correct its approach (and may update information in the ASR models 252) to reduce the recognition scores of incorrect approaches in future processing attempts.

In one aspect of the disclosure, the ASR engine 258 may use a finite state transducer (FST) to perform speech recognition. An FST is a graph that may include all possible words that may be recognized by the ASR engine 258. While the word result network of FIG. 3 may be created dynamically to recognize words, an FST may be static in that it is created in advance and the same FST may be used for the recognition of all utterances.

An FST may include paths for all sequences of words that may be recognized. The creation of an FST may be visualized by starting with the word result network of FIG. 3. The word result network of FIG. 3 may be built out to include all possible utterances that could be recognized by the ASR engine 258. Such a word result network would be potentially unbounded in size unless there was a limitation on the length of utterances that could be recognized. If the lexicon consisted of 100,000 words, there may be 100,000 arcs leaving the initial node of the node of the word result network. For each of the initial words, there may be 100,000 words that could follow. Thus, after only two words, there may be as many as 10 billion paths through the word result network. As utterances of three or more words are included, the size of the word result network will grow considerably larger.

An FST may allow for the recognition of all the words in the above word result network, but may do so with a graph that is smaller than the word result network. An FST may be smaller because it may have cycles and/or it may be determined and/or minimized. An FST may be determined if, for each node in the FST, each arc exiting the node has a different label. An FST may be minimized if it has the minimum number of possible nodes. For example, depending on the application, a given word may appear only once in an FST, and an FST may be cyclical so that a given arc of the FST may be traversed more than once for a single utterance. For other applications, words may appear in an FST more than once so that that context of the word may be distinguished. Although the above example considered an FST of words, an FST may represent sequences of other types, such as sequences of HMMs or HMM states. A larger FST may be creating by composing other FSTs. For example, an FST that includes words and phones may be created by composing an FST of words with an FST of phones.

In certain aspects, different finite state transducers (FSTs) are used for different speech processing tasks. One FST may be used for Hidden Markov Model (HMM) operations to input model temporal dynamics of speech such as phoneme duration (referred to as an "H" FST). Another FST may be used to model phonotactic context dependency (referred to as a "C" FST). Another FST may be the language FST used to map sequences of phones to words (referred to as an "L" FST). Finally, another FST, known as the grammar, models individual words to sequences of words that are likely to be used together (referred to as a "G" FST). Thus, the H FST transduces an audio feature vectors (corresponding to audio frames) into context dependent phones, the C FST enforces usage constraints and transduces context dependent phones to context independent phones, the L FST transduces context independent phones to words and the G FST transduces words to words that are likely to make sense together, as according to a language model.

In certain situations certain operations may be grouped into a large FST that incorporates the different operations such as an HCLG FST that incorporates all of the above operations, thus yielding a final search graph that is the composition of the above FSTs. In other situations the operations are grouped differently, where one FST is an HCL FST and another FST is a G FST. This configuration may be useful for domain-specific or user-specific (or other customized) grammars (i.e., G FSTs) that can be swapped in or out for different incoming speech requests, and paired with an existing HCL FST to obtain desired speech results.

An FST may be constructed based on the text corpus 180 that includes a large amount of text representing sentences that may be spoken by users. The FST is thus constructed so that it may represent a large number (though not necessarily infinite) number of potential sentences that may be spoken. The FST may be sufficiently granular, however, that each node may represent a particular acoustic unit (such as a senon, phoneme, etc.). Thus, each node/state of the FST may represent a portion in the progression of potential incoming sounds and how those sounds relate to spoken words. As incoming feature vectors corresponding to audio frames are processed by the ASR engine 258, it may travel from node to node along arcs of the FST. States/arcs that are traversed (and not pruned) are preserved to form a lattice. As each node of the FST is processed by a ASR engine 258, the engine 258 may keep track of the information associated with that portion of the FST (represented by outgoing labels on the arcs between FST nodes) to build the likely ASR result. Thus, words corresponding to traversed outgoing arcs may be used to construct the lattice, and from the lattice an N best list of potential ASR results.

The FST is thus a directed graph where each arc has certain properties such as input labels, output labels, a score associated with each arc, and an end node where the arc leads. As feature vectors for audio frames are processed by the ASR engine 258, it may traverse the FST to form a lattice representing potential speech recognition results, where the lattice is made up of nodes and/or arcs of the FST that, after traversal by the ASR engine 258, have satisfied the pruning thresholds to be maintained and not discarded. A lattice may also be formed using the acoustic models and language model described above. In the context of an FST, as the ASR engine 258 traverses through nodes in the FST, it may assign a score to each node or arc on the FST. After traversing an arc, the score of the arc of the FST, the score of the arc may be added to the total cost of the path leading to that arc. To save computational resources, the ASR engine 258 may prune and discard low recognition score nodes or paths that have little likelihood of corresponding to the spoken utterance, either due to low recognition scores, or for other reasons. Thus, a certain number of nodes may be preserved for each frame, and those states may be connected to states associated with the next frame (that survived a pruning), thus ultimately resulting in multiple paths through the FST representing potential speech recognition results. These multiple paths may be represented by the lattice, such as the lattice of FIG. 5, discussed below. After traversing the FST, the path with the best score (which may be the highest score or lowest score depending on the configuration of the FST) may be selected as the most likely path.

FIGS. 4A-4D illustrate different a small section of an ASR FST. As described below, the description of an FST, traversing an FST, etc. may discuss operating on states/nodes and arcs of the FST. As described below, operations described with regard to states of the FST apply to the node of the FST which represents the particular state the system may be in when traversing the FST. Thus, for data processing purposes, the terms state and node may be used interchangeably for purposes of discussing FST operation. In particular, FIGS. 4A-4D a small portion of an FST that may be traversed when processing audio data representing speech and determining whether that audio data corresponds to the word "bat" or the word "bad." The FST portion shows a single start state (state 0 shown in FIG. 4A) and multiple end states (states 62, 68, 69, 81, 82, and 83, shown in FIGS. 4C and 4D). In a full FST for speech processing there may be one or multiple start states and many more end states. Further, the end states may be located at various locations throughout the FST to represent different potential end portions that may be received by a potential utterance.

As can be seen in FIGS. 4A-4D, each state has one or more arcs outgoing from it that lead from the particular state to the next state. Each arc is associated with an input label, an output label and a score, shown in the figures as [input label]:[output label]/[score]. Thus, for example, arc 402 outgoing from state 0 to state 2 has an input label of 10, an output label of <eps> (explained below) and a score of 0.15137. The scores illustrated in FIGS. 4A-4D the scores represent scores or "costs" of each arc, where a lower scoring arc represents an arc that is more likely to be traversed/chosen than a higher scoring arc. In the present illustration of FIGS. 4A-4D, the illustrated scores roughly correspond to the negative logarithm of the probability the particular arc may be traversed, but multiple scoring configurations are possible. Further, the scores illustrated in FIGS. 4A-4D represent scores of the arcs in the FST prior to ASR processing. During processing, those scores will be adjusted using the scores of the acoustic model, as explained below. Although the scores illustrated represent one way of scoring arcs, other techniques may also be used. Further, while lower scores illustrated in FIGS. 4A-4D are considered "better," as in, more likely to be selected during ASR, in other configurations higher scores may be considered more likely to be selected.

As noted below, the input labels and output labels of an arc in an FST may include pointers to tables that track the individual labels. Further, for an ASR FST such as that illustrated in FIGS. 4A-4D, the input labels may correspond to individual acoustic speech units such as phonemes or senons or portions thereof. A senon is a grouping of HMI states which represents a particular grouping of phones as may be used together in speech. Each phoneme may have a number of incrementally different sounds depending on its context (e.g., the surrounding phones). While English may have approximately 50 phones it has several thousand sound groupings represented by senons. Use of senons in ASR processing may allow for improved ASR results. Thus, for example, arc 402 outgoing from state 0 in FIG. 4A has an input label of 10. That may correspond to entry 10 of an input label table, which in term may correspond to a particular phoneme or portion thereof, for example corresponding to a beginning of a "b" sound as might be spoken in "bat." Further remaining input labels on arcs outgoing from state 0 (4 in arc 404 from state 0 to state 3, 5480 in arc 406 outgoing from state 0 to state 5, 16 in arc 408 outgoing from state 0 to state 1, and 2 in arc 410 outgoing from state 0 to state 4) may each represent different acoustic units that may be identified by an acoustic model. In the example of the figures, these input labels may also correspond to different speech units that represent different ways of making a "b" sound. As the FST is traversed during ASR (explained below), the system may use the input labels to determine how to traverse the FST (based on the output from the acoustic model).

The output labels of the arcs may be collected by the ASR engine 258 for eventual use in outputting ASR results. As can be appreciated by FIGS. 4A-4D, however, many arcs have a label <eps> (either as input label or as output label) which represents the label epsilon (∈). Epsilon is representative of a null label. That is, arcs with <eps> as an output label, have no output label and thus do not contribute any words to a potential ASR result. Arcs with <eps> as an input label do not need acoustic input to be traversed, and thus may be traversed as part of ASR processing without a new input audio feature vector. For example, if the ASR engine 258 reaches state 10, it may traverse arc 430 from state 10 to state 15 as there is no input label on that arc that refers to an indexed acoustic unit. The ASR engine 258, however, will not traverse arc 432 outgoing from state 15 until a new audio feature vector is processed, as arc 432 has an input label of 5570, which refers to an acoustic unit, thus requiring a new audio feature vector be processed before arc 432 is traversed.

Figure 4B:
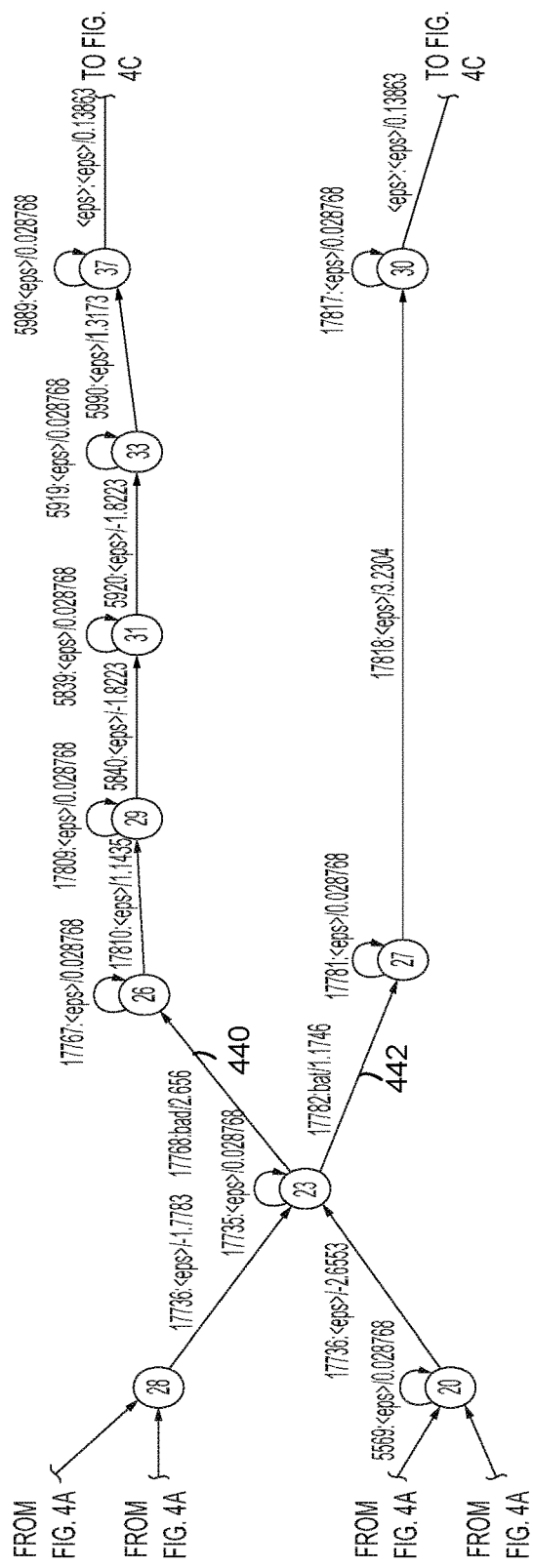
Figure 4C:
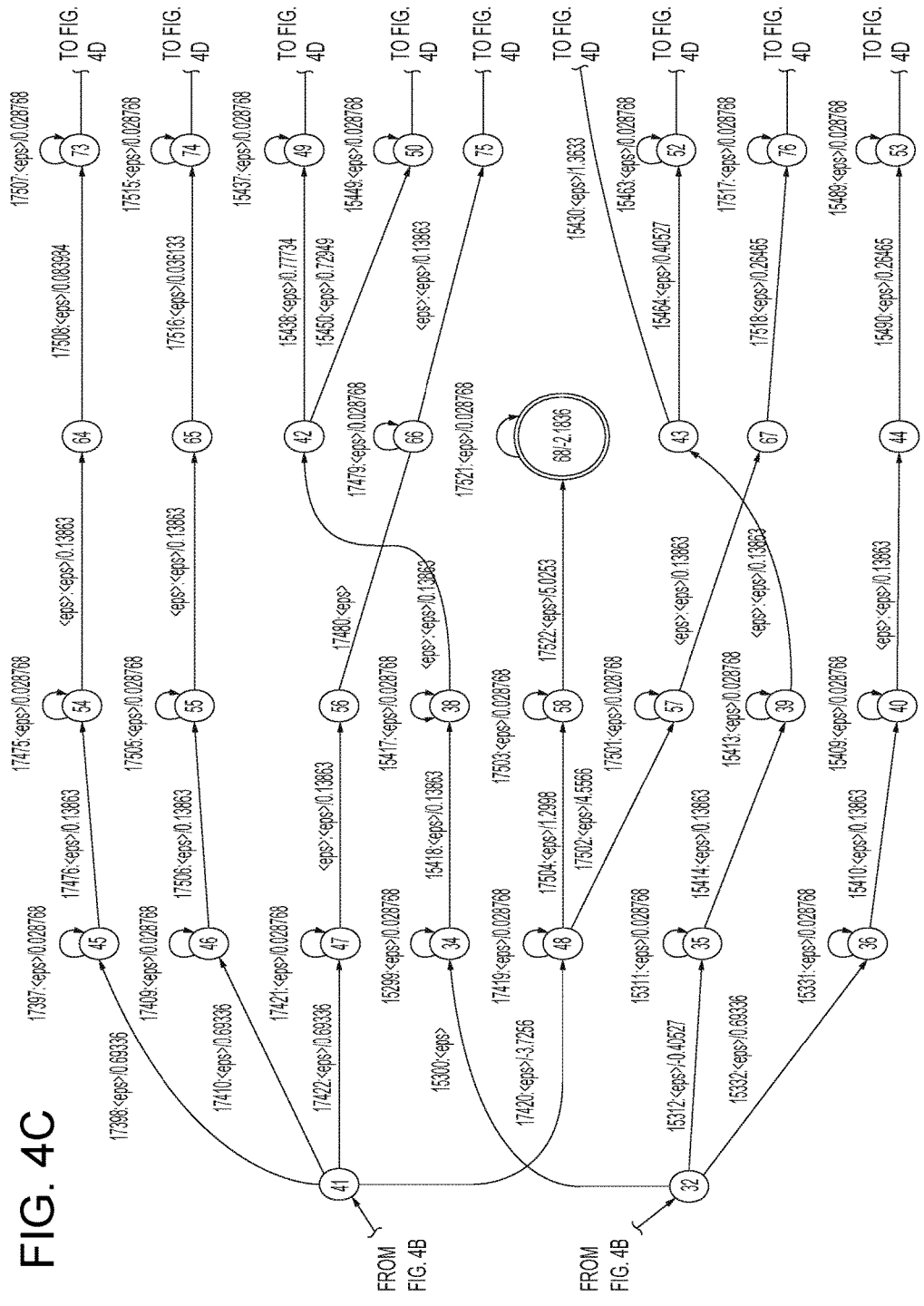
Figure 4D:
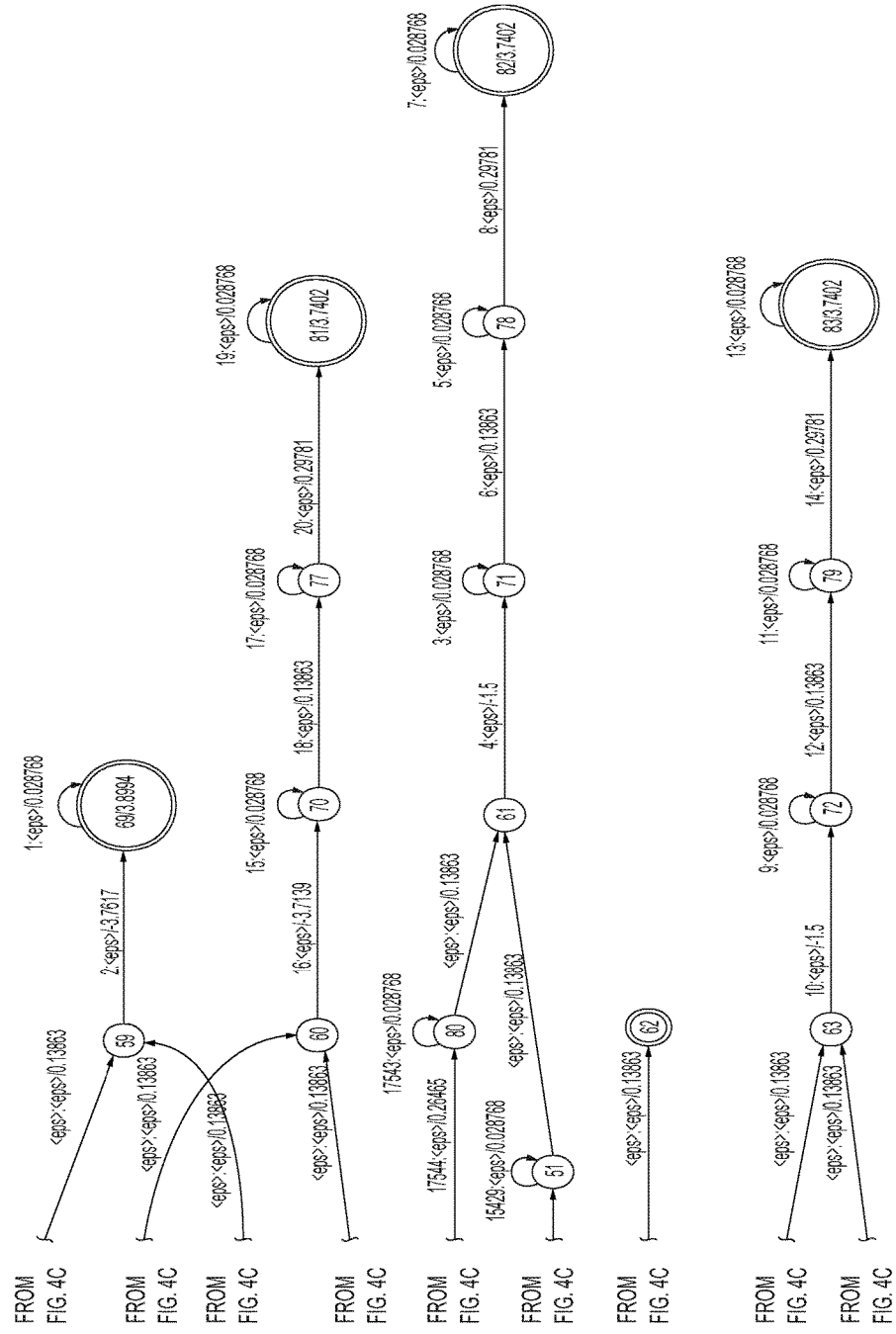

Only certain portions of an FST have an output label. For example, as shown in FIG. 4B, only arcs 440 and 442 have an output label. Arc 440, from state 23 to state 26 has an output label of "bad" and arc 442 from state 23 to state 27 has an output label of "bat." Because the FST portion of FIGS. 4A-4D only illustrate choosing between the words "bad" and "bat", the output labels corresponding to "bad" and "bat" are located at the point in the illustrated FST portion branches between the two words. Thus, only after the speech recognition system 258 has traversed those particular arcs (which can only be reached if the system traverses the arcs before), will the speech recognition system 258 output either the word "bat" or the word "bad" (with a corresponding score) from the FST. As can be appreciated, many states and arcs may be traversed before a word is output using an FST during ASR. This logically follows from the understanding that certain states of an FST may be correspond to a single audio frame, and an audio frame may be only 10 ms long. Thus many frames (and states) need to be processed before a word may be recognized.

Although an FST is a graphical construct as shown in FIGS. 4A-4D, when stored as data in the system, an FST may be represented as data in two or more tables. The two tables include a table of states (also called nodes) and a table of arcs. The FST may optionally include a table of input labels and a table of output labels for particular arcs, though those label tables may be stored separately (and thus not be considered part of) the FST. Though this is configurable. As an example, the state/node table may contain a record for each state/node, with each state record consisting of the following four fields:

(1) Final score of the state,
(2) Offset in the arc array pointing to the beginning of the list of arcs outgoing from the state,
(3) Number of outgoing arcs with epsilon (∈) input label, and
(4) Number of outgoing arcs with epsilon (∈) output label.

Each of these fields may be represented by a particular N-bit integer (e.g., 16, 32, etc.). The integer size for a particular field may be different from that of a different field.

Thus, to represent a state with many outgoing arcs (for example, state 0 in FIG. 4A) the table entry for state 0 would include a final score of state 0, a pointer to the arc table corresponding to an arc table entry for a first arc outgoing from state 0 (for example 402), a number of outgoing arcs from state 0 with a null epsilon input label and a number of outgoing arcs from state 0 with a null epsilon input label. As FIG. 4A is an incomplete portion of an FST, it does not illustrate all the arcs from state 0 and thus does not show all the arcs containing an epsilon label. Although the entry for state 0 may only include a pointer to a first outgoing arc from state 0, the arc table and state table may be organized so that the entry in the state table for the next state, e.g., state 1, includes a pointer to the arc table for the first outgoing state from state 1, e.g., arc 420. The system may thus determine that any arcs from 402 up to, but not including 420, are outgoing from state 0.

The arcs table may contain the following information for each arc:

(1) Arc score,
(2) Next state ID (the end point of the arc)
(3) Input label (which may be a pointer to a label in a table of input labels)
(4) Output label (which may be a pointer to a label in a table of output labels)

Each of these fields may be represented by a particular N-bit integer. The integer size for a particular field may be different from that of a different field. Thus, to represent a particular arc, for example arc 420, the entry in the arc table may include an arc score (e.g., 0.13863), the next state ID for the arc (e.g., state 6), the input label (e.g., a pointer in a table of input labels to input label 18, which may correspond to a particular acoustic unit), and the output label (which is epsilon and thus may be blank, or set to a particular value that represents epsilon, or may point to an entry in the table of output labels that represents epsilon).

During runtime ASR processing, the ASR engine 258 may take incoming audio feature vectors corresponding to audio frames and may process them with an acoustic model 253. For each processed feature vector, the acoustic model processing will then result in acoustic model output including a list of potential acoustic units corresponding to the feature vector along with a corresponding list of acoustic scores for the respective potential acoustic units. The ASR engine 258 will then identify those acoustic units in the input labels of particular states currently under consideration at the FST and will re-score the arcs associated with those acoustic units using both the acoustic scores and the scores of the arcs built into the FST.

Take, for example, state 0 of FIG. 4A as an active state being considered as part of ASR processing. An incoming feature vector is received by the system and processed by the ASR engine 258 using acoustic model 253. The output of that processing may give certain scores for the acoustic units represented in the input labels of the arcs outgoing from state 0, for example:

unit 10, acoustic score $s_1$
unit 4, acoustic score $s_2$
unit 5480, acoustic score $s_3$
unit 16, acoustic score $s_4$
unit 2, acoustic score $s_5$ The ASR engine 258 may then take acoustic score $s_1$ and use it to adjust the existing score (0.84451) of arc 402 (which corresponds to unit 10) to determine an updated score (0.15137). The scores may be added together, multiplied, or any other technique of combination. The resulting combined score may then be maintained by the system as the processed score corresponding to arc 402. The same process may be performed for each of the arcs outgoing from state 0 (as each of them have an input label corresponding to an acoustic unit) based on the scores corresponding to the acoustic units of their respective input labels, thus resulting in:

$$\text{Updated score for } 402=0.84451+(s_1 * sf)=0.15137$$

$$\text{Updated score for } 404=0.84451+(s_2 * sf)=-0.15137$$

$$\text{Updated score for } 406=-0.22287+(s_3 * sf)=-0.91602$$

$$\text{Updated score for } 408=-1.5979+(s_4 * sf)=-2.291$$

$$\text{Updated score for } 410=-1.5979+(s_5 * sf)=-2.291$$

where sf is a scaling factor configured to adjust the acoustic scores so that they can be added to the scores of the FST. The scaling factor may be based on the particular acoustic model and/or FST. The same scaling factor may also be used to adjust each of the acoustic scores.

The destination states for the arcs processed (for example, states 1-5), may then be held in memory while the ASR engine 258 processes the next incoming feature vector corresponding to the next audio frame. The above process will then be repeated, so the acoustic model processing will output acoustic units with corresponding scores, the engine 258 will identify the corresponding units in input labels in arcs outgoing from FST states under consideration by the engine 258, the combines scores will be determined and stored. The process will continue in this manner for all input audio.

As the ASR engine 258 traverses the FST it will continue traversing states and arcs until it reaches a state with an outgoing arc, where the outgoing arc includes an input label corresponding to an acoustic which, which thus means the arc requires new information from the acoustic model to be traversed. For example, the ASR engine 258 may continue to traverse arcs until it arrives at an arc that has an input label corresponding to an acoustic unit. The ASR engine 258 will then wait for the next feature vector to be processed and for further input to come from the acoustic model until it continues processing. In this manner the ASR engine will perform time-synchronous decoding and will only consider portions of the FST in a frame-by-frame manner. That is, all the portions of the FST being processed at a particular time will all correspond to the same input audio frame/feature vector.

Further, as the ASR engine 258 traverses the FST, it may accumulate the combined scores for each path of the traversed nodes and/or arcs traversed up to each point in the FST. The combined score may be a sum of the updated scores (i.e., post acoustic model scores) of each state and/or arc traversed. For example, referring to the portion of the FST shown in FIG. 4A, if the ASR engine 258 has traversed along five paths to the point where it is currently at states 7, 8, 10, 6 and 9, each path will have a combined score leading up to the that point in the path. That is, the combined score for path 1 (currently at state 7) will be the summed updated scores for the nodes and arcs leading from state 0 to state 7, the combined score for path 2 (currently at state 8) will be the summed updated scores for the nodes and arcs leading from state 0 to state 8, the combined score for path 3 (currently at state 10) will be the summed updated scores for the nodes and arcs leading from state 0 to state 10, the combined score for path 4 (currently at state 6) will be the summed updated scores for the nodes and arcs leading from state 0 to state 6, and the combined score for path 5 (currently at state 9) will be the summed updated scores for the nodes and arcs leading from state 0 to state 9.

As the ASR engine 258 operates, there are certain pruning settings that affect how many states the ASR engine 258 may consider. One such pruning setting is the beam width. The beam width is a measurement of the score difference between a best scoring state (corresponding to the particular audio frame being processed) and the cutoff point. Any states outside the pruning settings will be discarded and not considered during further ASR processing.

When the ASR engine 258 has completed processing for a particular feature vector, that is the ASR engine 258 has processed the output from the acoustic model for the feature vector and rescored all the arcs and states corresponding to the acoustic units/scores output by the acoustic model (while discarding those that fall outside the beam width), there may be a certain number of states left within the beam that have received their combined scores. (Though note that not every state/arc will receive a combined score, only those that correspond to acoustic units seen by the AM will receive a combined score.) As the ASR engine 258 will continue to traverse arcs and states until a new acoustic unit is indicated as an input label, the states remaining after processing data for a particular audio frame will have outgoing arcs that correspond to an acoustic unit. Those outgoing arcs for those states will then be considered by the ASR engine 258 as new data for the next feature vector comes from the acoustic model processing.

The number of such states, however, may be very large which may result in significant processing by the ASR engine 258. Thus, the ASR may use a different pruning setting, namely a threshold number of active states. The threshold number of active states indicate the threshold number of states the ASR engine 258 will consider after processing acoustic model data from a first audio frame before it considers acoustic model data from a next audio frame. That is, if a threshold number of active states is 1000, and after processing data for a first audio frame, the engine 258 is considering 1,250 states corresponding to the first audio frame, the ASR engine will discard 250 states before beginning processing of data corresponding to the next audio frame. The discarded states are the states that have the lowest scores among the remaining active states (even if the discarded states were within the beam width). Thus, the maximum number of states keeps the ASR engine 258 from being overwhelmed as it transitions from frame to frame.

As the ASR engine 258 traverses the FST it may store data corresponding to the states and arcs traversed along with their combined scores. That may include a table of entries, sometimes called tokens, where each token corresponds to a state in the search space (i.e., the traversed portions of the FST that fell within the beam width and the threshold number of active states). Each token may include a score representing the likelihood that the state is reached from the beginning of the utterance up until the frame of the state. The token may also include a pointer in the table to a previous state, such as the state most likely to lead to the present state, and the arc from the most likely previous state to the present state. The token may also include the input label and output label (if any) of the arc that leads from the most likely previous state to the present state. The input label and/or output label may be a pointer to a table of labels and may indicate a phoneme, senon, word, or other speech unit. The token may also include links to more than one previous state (and corresponding scores, arcs, labels, etc.).

Figure 5:
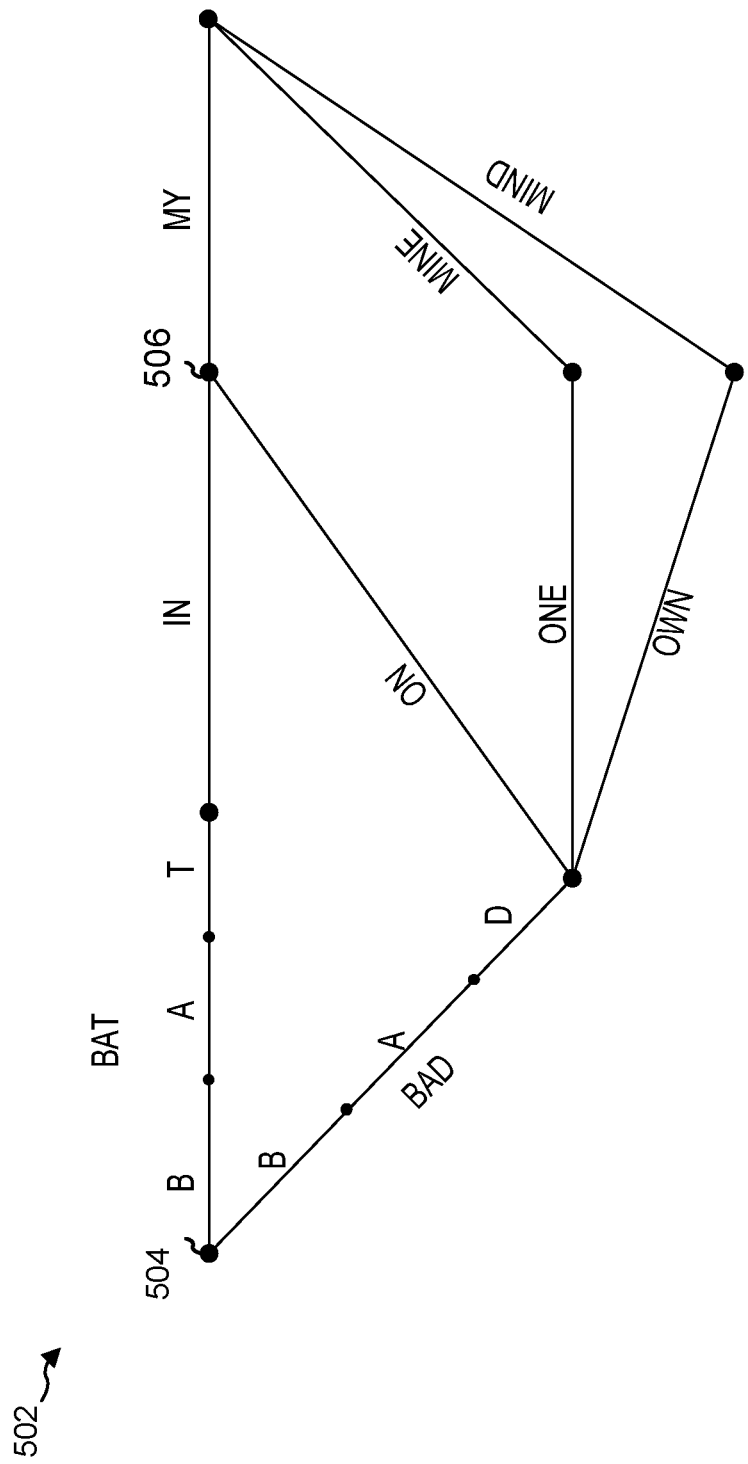
FIG. 5 illustrates a word lattice according to embodiments of the present disclosure.

As the ASR engine traverses portions of the FST, it may use the table of tokens representing the states and arcs traversed, along with their combined scores, to create a lattice of potential paths representing potential ASR results. A sample lattice is shown in FIG. 5. The lattice 502 shows multiple potential paths of speech recognition results that may have been determined by the ASR engine 258 by traversing an FST or by using different acoustic model/language model processing. Paths between large nodes represent potential words (for example "bad", "bay", etc.) and paths between smaller nodes represent potential phonemes (for example "B", "A", "T", and "B", "A", "D"). For purposes of illustration, individual phonemes are only shown for the first two words of the lattice. The two paths between node 504 and node 506 represent two potential word choices, "bat in" or "bad on". Each path point between nodes (such as a potential word) is associated with a recognition score. Each path across the lattice may also be assigned a recognition score. The highest recognition score path, where the recognition score is a combination of the acoustic model score, the language model score, and/or other factors, may be returned by the ASR engine 258 as the ASR result for the associated feature vectors. Following ASR processing, the ASR results may be sent to a downstream component, such as a command processor 290 for further processing (such as execution of a command included in the interpreted text). Thus the data preserved by the ASR engine 258 during traversal of the FST may result in a lattice representing the most likely possible ASR results (as the least likely results were discarded during pruning). The mostly likely path of the ASR results, sometimes called the Viterbi path, may be selected as the top scoring result for command execution.

FSTs can constitute the bulk of an ASR model, with HCLG being particularly large, sometimes reaching tens of gigabytes in some models. As noted above, an HCLG functionality maybe incorporated into a single FST. In other configurations, HCL functionality may be incorporated in one FST, whereas G functionality (i.e., functionality of a grammar or language model) may be incorporated into a different FST. In such as situation, an HCL FST is traversed using output from an acoustic model (as generally described above) to traverse the HCL FST, with the resulting output being one or more potential words and corresponding scores. When the end of a word is reached the HCL FST is traversed again anew (using further acoustic model output) for the next word. Each word(s) and corresponding score(s) from the HCL FST is then output for the system to use traverse the G FST. The G FST represents the possible word groupings (e.g., sentences) that the system may expect to receive. The G FST (or other form of language model) is constructed based on the universe of example text used by the system when building the language model.

Figure 6:
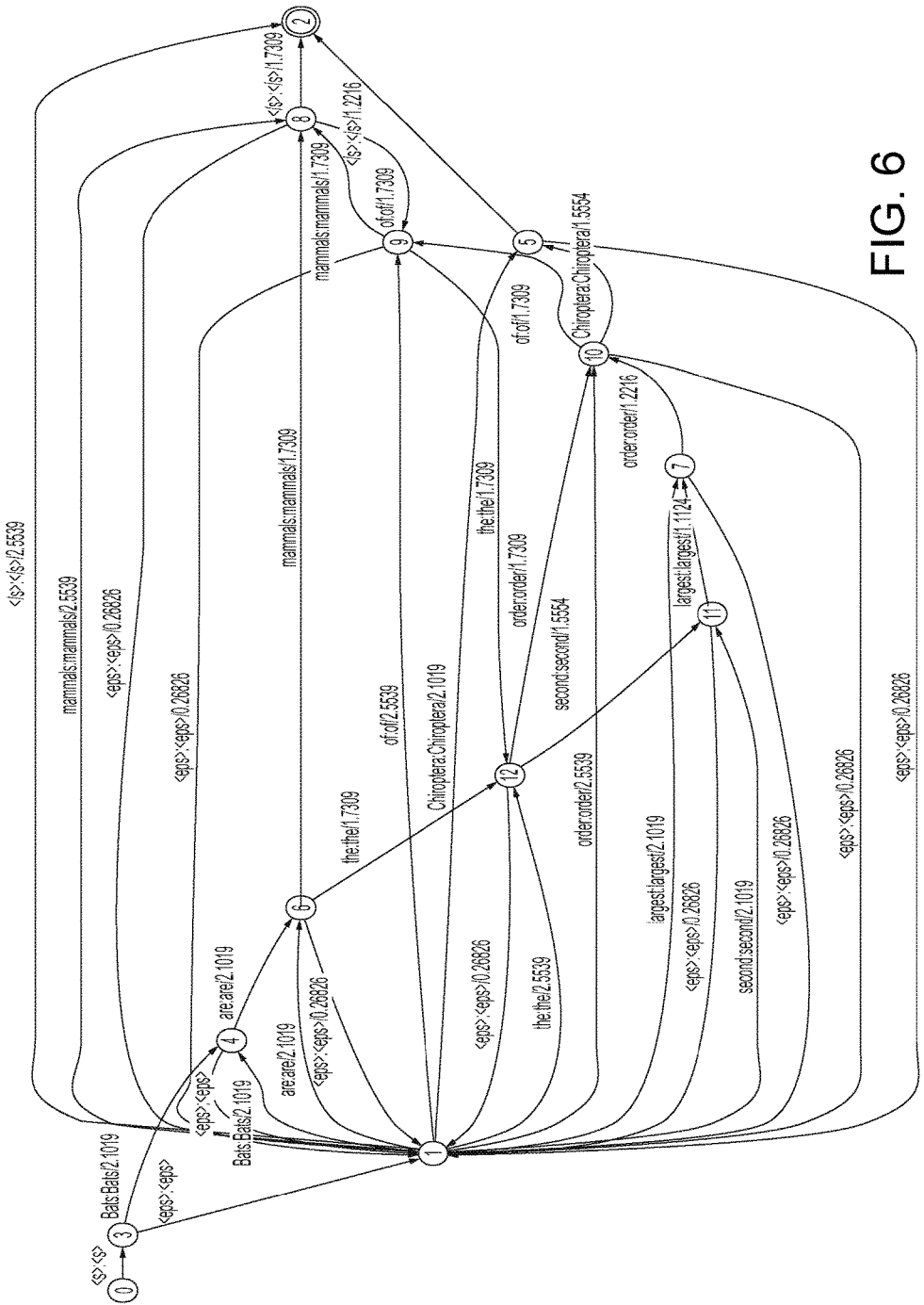
FIG. 6 illustrates a section of a finite state transducer according to embodiments of the present disclosure.

An example of a portion of a G FST is shown in FIG. 6. The FST portion shown in FIG. 6 is a portion of a G FST language model constructed from two sentences, the first being "bats are mammals of the order Chiroptera" and the second being "bats are the second largest order of mammals." The portion of the FST shown in FIG. 6 may normally appear in a much larger FST as part of a general ASR language model, but is shown in FIG. 6 for purposes of illustration. Further, while a complete G FST may be configured to recognize any sequence of the words shown in FIG. 6, the particular illustrated sequences may be more likely due to the construction of the FST (which itself is based on a universe of available text from a text corpus). To traverse the G FST, word outputs from an HCL FST (or other model configured to construct words from sounds output by an acoustic model) are used to determine which arcs to traverse along the G FST. As arcs are traversed, word output labels associated with those arcs are output to form the potential text output that is eventually output as the ASR result. Multiple paths through a G FST may be traversed (with respective scores) thus resulting in an N-best list output of a word string (e.g., a sentence) that potentially represents the input audio data.

Although a G FST may have an arbitrary structure, a language model may have an N-gram model. An N-gram is an ordered sequence of N words. Thus, a size 2 N-gram (also called a bigram) includes two words in order for example "I am," "I think," or the like. A size 3 N-gram (also called a trigram) includes two words in order for example "I like to," "I need to," or the like. Certain benefits to representing word groupings as N-grams in a language model FST may include ease of construction and of use of FSTs, fast computation during runtime decoding of input speech and efficient representation within the FST.

Figure 7:
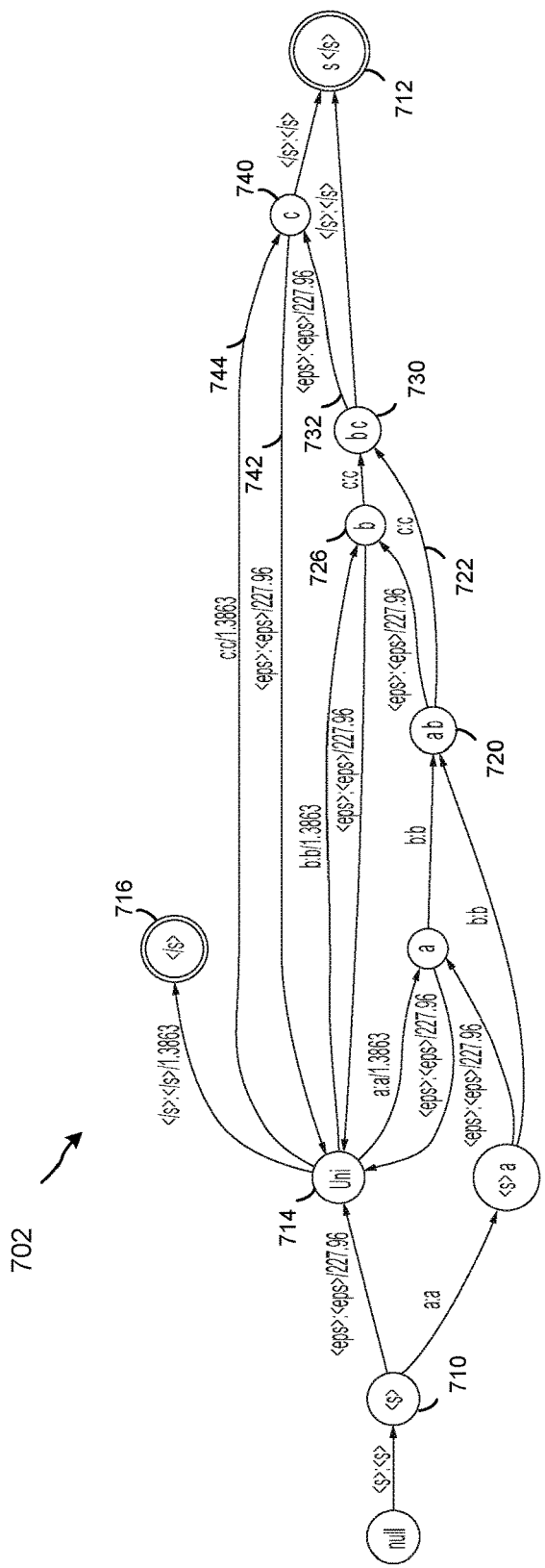
FIG. 7 illustrates a section of a finite state transducer according to embodiments of the present disclosure.

One example of an FST portion incorporating N-grams is shown in FIG. 7. As shown in FIG. 7, 702 is an FST portion illustrating a sentence which contains the three words "a," "b," or "c." As illustrated, the portion 702 also includes representations for bigrams "ab" and "bc" and the different paths between them (and the individual words) that may be traversed during speech processing.

Although illustrated graphically, as stored in a system an FST incorporating N-grams may be stored as a set of data structures such as an arc table, a state table, a label table, or other data structures such as those described above. Such data structures represent the FST in the system.

In order to construct an FST (either with or without N-gram) and the data structures representing the FST, the system first acquires many different examples of text representing many different examples of word sequences (e.g., sentences) that the system may eventually encounter during speech processing. Such word sequences may be obtained from many different examples of text corpus(es) 180. A word that appears in the example text may be represented as a state in the language model/G FST. If a first word is followed by a second word in the example text, the G FST may include an arc from the state of the first word to the state of the second word. The score/weight associated with the arc may be based on how often the first word is followed by the second word in the example text, that is, the likelihood of given a word A, the next word is B. Similarly, for N-grams, a word sequence (N-gram) that appears in the example text may be represented as a state in the language model/G FST. The score/weight associated with the state of the N-gram may be based on how often the N-gram appears in the example text corpus. If the N-gram is followed by another word in the example text, the G FST may include an arc from the state of the N-gram to the state of the next word.

The score/weight associated with the arc may be based on how often the N-gram is followed by the next word in the example text.

Thus, for a word sequence $\vec{w}$ the probability of the word sequence $p(\vec{w})$ may be represented as:

$$p(\overrightarrow{w_{1-m}}) = p(w_1)p(w_2 | w_1) \ldots p(w_n | w_{m-1} \ldots w_1) \quad (1)$$

where a particular N-gram's probability may be conditioned on only the previous n−1 word history, p(w|h) where h is the history of the word. For example, a 4-gram model approximates the probability by conditioning the probability of a particular 4th word given the previous 3 words:

$$p(\overrightarrow{w_{1-m}}) = p(w_1)p(w_2 | w_1) \ldots p(w_m | w_{m-1} \ldots w_{m-3}) \quad (2)$$

For the first few words, since there are not enough words for context, lower N-gram probabilities may be used (for example a 2-gram for $p(w_2|w_1)$).

In the example of FST portion 702, which illustrates a sentence which contains the 3 words "a," "b," or "c," the scores in the portion 702 may be based on the example text taken from the text corpus(es) at the time the FST portion 702 was constructed. The portion 702 also includes a start of sentence <s> state 710 and end of sentence </s> states, such as 712 or 716. Further, values within each state may include information about the history $h_j$ that has been seen thusfar in the FST portion and the outgoing arcs to other word states from each state are weighted based on the possibility of seeing that next word $w_i$ given the history. Thus each arc is weighted by the probability $p(w_i|h_j)$ As illustrated, the FST portion 702 may be traversed to create any sentence that is a combination of words "a," "b," or "c." At runtime, while processing an incoming speech request, the system may receive one or more words (such as a, b, or c for the example of FIG. 10) and corresponding score output from an HCL FST or other component. The system may then weight the next set of arcs and/or scores based on the word(s). For example, an output of "c" may cause the system to find an arc with the input label of c and create an adjusted score for that arc based on the score sent from the HCL FST and the pre-set initial score for the arc built in to the FST. The system may also traverse arcs to arrive at states representing N-grams. In doing so the system may traverse arcs with output labels corresponding to the desired words. For example, to traverse FST portion 702, the system may start at start of sentence <s> state 710, and traverse the arcs using words output from, for example, an HCL FST, as well as the scores of the arcs of FST 702 until the system reaches an end of sentence </s> state, such as 712 or 716.

As can be appreciated, the construction of an FST and the scores of arcs within the FST depends on the training data, i.e., the example text available in the text corpus(es). If when traversing an FST, the system is at a state representing an N-gram, but the next word output from the HCL FST does not appear as an input label on an arc outgoing from the state of that N-gram (which may mean the next word never appeared after the N-gram in the example text), the system must "back off," i.e. traverse the FST to shorter N-grams (such as from three words to two words, etc.) until the system reaches a state from which an arc can be reached where the arc has the next word as an input label. One drawback to this approach is that when the system backs off to a shorter N-gram, it loses some of the history information embedded in the state of the longer N-gram, and thus may result in less precise language modelling.

The FST portion of 702 may be used to illustrate backoff at runtime. If an input sentence includes the words "bcc" the system will start at the beginning sentence state 710 and then will traverse to unigram ("Uni") state 714. From there the system will traverse to the state 726 representing word "b" (across an arc with the output label of "b") and then to the state 730 representing bigram bc (across an arc with the output label of "c"). From state 730, however, there is no outgoing arc that has the input label of "c" for the system to traverse (according to the third word output from the HCL FST) to thus complete the sentence of "bcc." Therefore the system must "back off" from the state 730 representing bigram bc to state 740 representing word (also called a unigram) "c" by traversing arc 732 which has a null output label <eps>. By backing off in this manner, the system "forgets" that the word "b" proceeded the first instance of the word "c" for purposes of traversing the FST. As there is no outgoing arc from state 740 that includes the input label "c," the system must again back off, this time across arc 742 to Uni state 714. From there the system may traverse arc 744, which has an input label of "c" and an output label of "c," thus resulting in an output label of "c" and ending up again at state 740. From there, the system may now traverse to the end state 712, thus ending the processing of the sentence and outputting the words "bcc."

Backing off in this manner is not desired as each backoff results in changing the probability from whether the next word (in this example "c") follows the previous words (in this example "bc") to whether the next word ("c") simply appears on its own from the Uni state 714 (which incorporates no history of what words came before. More accurate results may be obtained if the history of previous words can be maintained while traversing the FST, however as illustrated, that is not always possible. This is not possible because not every N-gram and next word combination may be included in the set of example text that was used to create the FST. Thus not every N-gram/next word combination is represented in the FST by an arc from the N-gram state that will generate the next word without backing off.

One solution to this problem is to adjust the weights of an FST, and potentially to include new arcs in the FST, that account for usage similarity between particular N-grams in language model. For example, if a first N-gram is used similarly in the example text corpus to a second N-gram, the system may adjust the weights along arcs outgoing from the first N-gram based on the frequency of appearance of the second N-gram. Further, the system may create an arc from the first N-gram to the second N-gram to allow the system to "back off" from one N-gram to another similar length N-gram rather than from a longer N-gram to a shorter N-gram (i.e., from a trigram to a bigram). In this manner, some representation about the usage similarity between the first N-gram and second N-gram may be built into the FST/language model and used at runtime.

Figure 8:
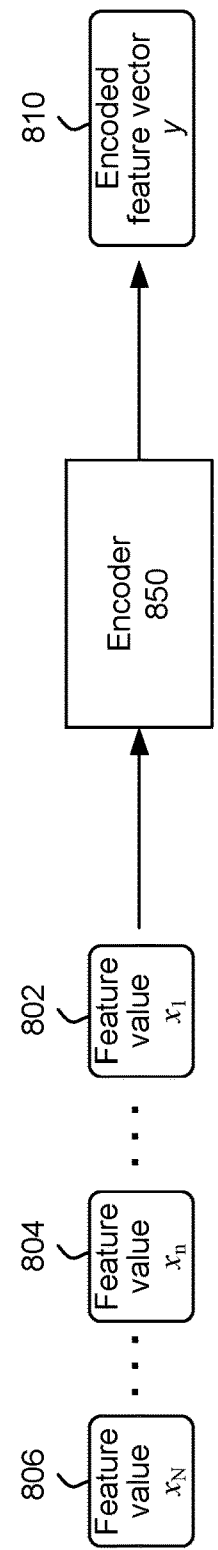
FIG. 8 illustrates operation of an encoder according to embodiments of the present disclosure.

To accomplish this, the system may determine, using the example text corpus, which N-grams are used similarly to each other (i.e., have a usage similarity). One way to do this is to represent each N-gram that appears in the original FST as an encoded vector describing how the N-gram is used. In mathematical notation, given a sequence of feature data values $x_1, \ldots x_n, \ldots x_N$, with $x_n$ being a D-dimensional vector, an encoder $E(x_1, \ldots x_N)=y$ projects the feature sequence to y, with y being a F-dimensional vector. F is a fixed length of the vector and is configurable depending on user of the encoded vector and other system configurations. For example, F may be between 100 and 1000 values for use in speech processing, but any size may be used. As shown in FIG. 8, feature values 802 through 806 may be input into an encoder 850 which will output an encoded feature vector 810 that represents the input feature values. Any particular encoder 850 will be configured to output vectors of the same size, thus ensuring a continuity of output encoded vector size from any particular encoder 850 (though different encoders may output vectors different fixed sizes) and enabling comparing different feature vectors y. The value y may be called an embedding of the sequence $x_1, \ldots x_N$. The length of $x_n$ and y are fixed and known a-priori, but the length of N of feature sequence $x_1, \ldots x_N$ is not necessarily known a-priori. The encoder E may be implemented as a neural network (NN), recurrent neural network (RNN), or other model. There are a variety of ways for the encoder 850 to consume the encoder input, including but not limited to:

linear, one direction (forward or backward),
bi-linear, essentially the concatenation of a forward and a backward embedding, or
tree, based on parse-tree of the sequence, In addition, an attention model can be used, which is another RNN or DNN that learns to "attract" attention to certain parts of the input. The attention model can be used in combination with the above methods of consuming the input.

FIG. 8 illustrates operation of the encoder 850. The input feature value sequence, starting with feature value $x_1$ 802, continuing through feature value $x_n$ 804 and concluding with feature value $x_N$ 806 is input into the encoder 850. The encoder 850 may process the input feature values as noted above. The encoder 850 outputs the encoded feature vector y 810, which is a fixed length feature vector of length F.

For encoding vector representations of N-grams, different feature values may be used. The feature values may include how the N-gram appears in the example text relative to other text. For example, where in a sentence the N-gram appears, what words can precede the N-gram, what words can follow the N-gram, the frequency of the N-gram in certain situations, etc.

As can be appreciated, many different characteristics of the N-gram may be represented in this manner. Many different types of feature data may be considered by the server. One example of a characteristic is a word embedding. A word embedding is a representation of how a word (or string of words) is typically used in language, as may be represented by how a word is used in the example text corpus (i.e., collection of text) or plurality of text corpuses. The word embedding is typically a high-dimensional vector (e.g., 200-500 dimensions) that represent word or word sequence usage. Thus, for N-grams, the feature values (e.g., 802-806) input into an encoder may be the words and embeddings of the words of the N-grams. Such word embedding data may enable the system to determine synonyms of words or otherwise rearrange words when processing/answering an incoming question. To determine a word embedding or word usage data, using the data from one or more data sources 180, the system may analyze individual words and their respective usages. The usage characteristics for a particular word may be specific to a single data source 180 or may represent usage of the word as it appears over multiple data sources 180. Usage characteristics corresponding to a word may be tracked and represented in a number of different ways. One way of representing word usage characteristics is with a data vector, where the data vector (such as encoded feature vector y 810) includes a number of characteristics representing how the word issued. For example, the vector may include characteristics indicating how often another word is used next to the subject word, how often the other word is used two words away from the subject word, etc. As can be appreciated, such vectors may become large, with thousands of characteristics resulting in thousands of data values (called dimensions) for each vector. The particular size of the vector may be configurable depending on the characteristics the system will evaluate when considering the usage of any particular word. Further, even with very large vectors, only certain dimensions of each vector may be evaluated when considering the usage of any particular word. With vectors available for each word of interest to the system (for example, all or some portion of the words in a data sources 180, ASR lexicon, or the like) the usage characteristics (e.g., usage vectors) may be compared against each other to determine which usage characteristics/vectors are similar. Similar word usage characteristics/vectors may indicate similar usages between individual words.

The system may then map multiple vectors, each corresponding to the usage of a particular word, into a vector space. Given the number of dimensions for each vector, the vector space may be a high dimensional vector space. A number of known techniques for manipulating vectors in high dimensional (or other) vector space may be used to compare analyze vectors and compare vectors to each other. One example for representing and analyzing word usage characteristic as vectors is the GloVe: Global Vectors for Word Representation project by Jeffery Pennington, Richard Socher, and Christopher D. Manning of the Computer Science Department of Stanford University published in 2014, though other techniques may be used. Further, vectors are one example of tracking and comparing word usage characteristics, other techniques may be used.

Figure 9:
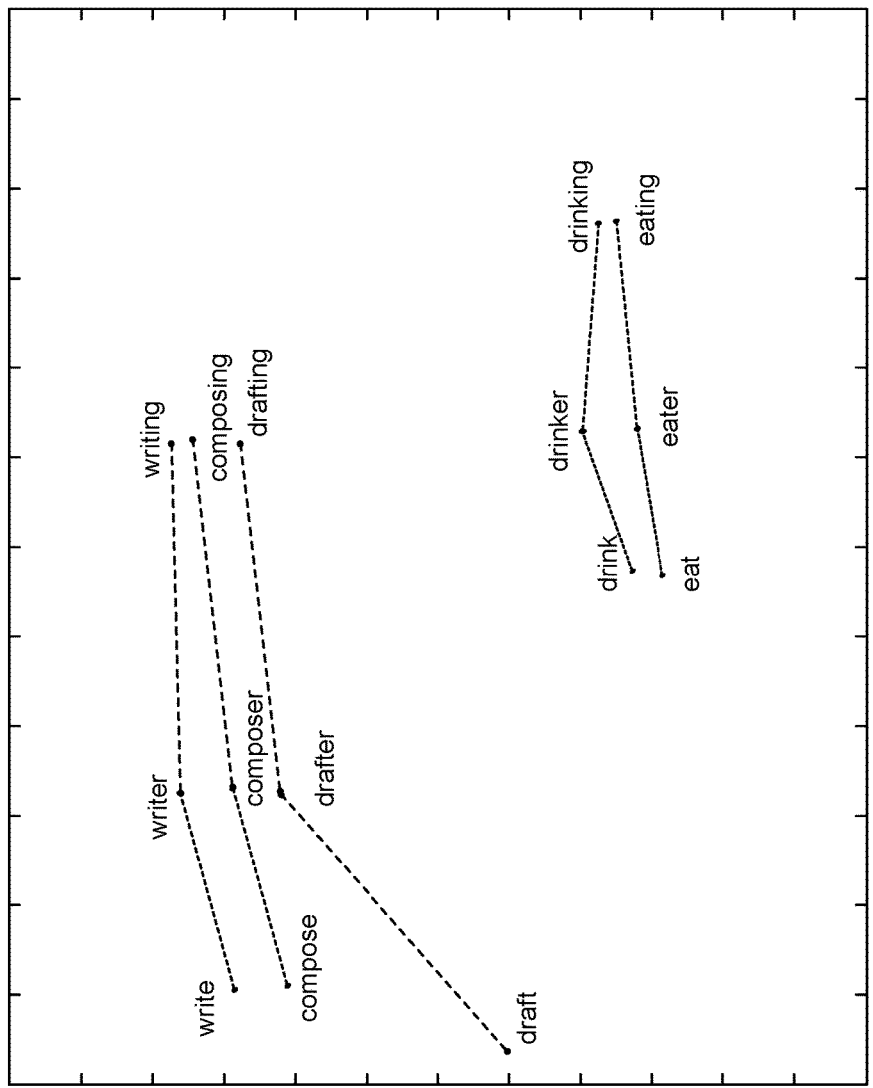
FIG. 9 illustrates representations of word usage similarity in a vector space.

Representing words in a vector space may be useful for showing the relationship between usage of individual words, as well as showing the relationship between usage of variations of a particular word and showing the relationship between the same usage variation across different word roots. Thus, a vector space may be used to represent sematic relationships between words as geometric relationship between vectors. For example, FIG. 9 illustrates a number of words in a hypothetical vector space where each point represents the vector location for the particular word. Although illustrated as located in a two-dimensional graph for discussion purposes, the usage vectors for the words illustrated in FIG. 9 would be in a high dimensional space. Further, FIG. 9 is shown for example purposes only and the vector locations/relationships do not necessarily reflect a true graphing of the usage of the illustrated words.

As illustrated in FIG. 9, certain words that have similar meaning may be close to each other in the vector space (indicating a similarity of usage characteristics). Also, certain words that have different meanings may also be close to each other in the vector space (also indicating a similarity of usage characteristics). In the top portion of the illustration, words "writer," "composer" and "drafter" are located near each other, indicating that those three words are used similarly in the word data used to generate the vectors of FIG. 9. Similarly, the words "writing," "composing" and "drafting" are also located near each other, also indicating that those three words are used similarly. The words "write," "compose," and "draft" are not as close in the illustration, with "draft" in particular being located farther away from "write" and "compose" than those words are to each other.

This distance may be due to other uses of the word "draft" that may differ from "write" and "compose," for example, "draft" has a known noun form, where the "write" and "compose" do not and "draft" may also have other meanings (such as a cold interior breeze) that differ from "write" and "compose."

Further, the variations of the words (save for "draft") have similar usage relationships relative to each other. For example, the usage relationships of "write" to "writer" to "writing" is similar to the usage relationship between "compose" to "composer" to "composing" as shown by the lines connecting those triplets of words. Other, non-illustrated variations may also exist (such as "writes," "drafted," etc.) with their own vectors and usage relationships to other words.

Words in the bottom corner of FIG. 9 exhibit similar relationships to each other as the words discussed above. The words "drink" and "eat" have different meanings, but similar usages as illustrated. Further, the usage relationships of "drink" to "drinker" to "drinking" are similar to the relationships of "eat" to "eater" to "eating." Also, "drink" shows a similar usage to "eat," "drinker" shows a similar usage to "eater" and "drinking" shows a similar usage to "eating." As "eat," "eater," and "eating" are all variations of a first word root, and "drink," "drinker," and "drinking" are all variations of a second word root, the system may use the usage relationships of these words to create new variations of another new word that shares usage with one of the variation forms. Thus, if a new word is found that is similar in usage to "eat" and/or "drink" the system may infer that the new word may have a variation of the form "x-er" or "x-ing" where x is the root of the new word. That is, if a vector corresponding to a new word is within a threshold distance to "eat" and/or "drink" the system may determine that the new word is used similarly to "eat" and/or "drink" and may create variations for the new word based on the variations of "eat" and/or "drink." Various known techniques, such as Cosine distance, Euclidean distance, Manhattan distance or other techniques may be used for determining a difference between word usage, or word usage vectors. Known techniques such as using a Levenshtein distance may be used for determining a difference between text strings. These distances may be measured by taking the difference between vectors (e.g., by subtracting one vector from another).

Thus, an N-gram may be represented by a word embedding vector that corresponds to how the N-gram is used in the example text that is analyzed to create the word embedding vector. The word embedding may be created using a neural network language model (NNLM). The NNLM may include a continues space language model, skip-gram language model, positional language model or other model. The NNLM may be trained using various known model training techniques, such as stochastic gradient descent with back-propagation, which allows the model to iteratively update internal weights during the training process. The NNLM may be trained using example probabilities for particular N-grams, where the probabilities may be based on how often a particular N-gram appears in example text, where the example text may be made up of different word corpuses used for NNLM training. During training, the NNLM may be fed example training text along with indicators (e.g., ground truth labels) of a particular word sequence (N-gram) validity. The distributed representation in the NNLM's hidden layer may be mapped into a high dimensional vector that may be used as the word embedding.

Once N-grams are represented by a vector, the system may determine if the N-grams have a sufficiently similar usage by determining if their respective vectors are sufficiently "close" in a multi-dimensional vector space. For example, the system may determine that a first N-gram is similar to a second N-gram by determining that a first vector representation of characteristics of the first N-gram is within a threshold distance/difference of a second vector representation of characteristics of the second N-gram. (The distance may be calculated using a number of different techniques including using cosine, L2, Levenshtein distance, etc.) This may be done for multiple N-grams. For example, a first N-gram may be determined to be similar to a second N-gram as well as a third N-gram, fourth N-gram, etc. For a specific example, the N-gram "I want to" may be determined to be used similarly in the text corpus to the N-grams "I like to," "I need to" or other such N-grams. While two N-grams having a same length may be determined to be similar (e.g., a three word length N-gram is determined to be similar to another three word length N-gram), N-grams of different lengths may also be determined to be similar as described herein (e.g., a three word length N-gram may be determined to be similar to a four word length N-gram). The text corpus to determine N-gram similarity may be different from, or the same as, the text corpus used to create the FST.

If two (or more) N-grams are determined to have similar usage, the scores of those N-grams may be combined to adjust the scores within the FST. The score related to a particular N-gram as represented in an FST is determined by extracting the count for a particular N-gram $n_i$ where the count represents the frequency of occurrence of the N-gram in the text corpus (i.e., how often the N-gram appears in the example text of the text corpus(es)) and then calculating the probability of each word in a given history $$P(w_i \mid h_i) = \frac{\text{count}(w_i, h_i)}{\text{count}(h_i)} \text{ where } n_i = w_i h_i.$$

To incorporate some representation within the FST/language model of the similarity of particular N-grams to each other, the count of each N-gram (which is used to create the score for the FST) is boosted using the counts of other N-grams similar to it. Thus, the count of a particular N-gram $c(n_i)$ may be adjusted as follows:

$$c(\hat{n}_i) = c(n_i) + \Sigma_{n_j} \text{sim}(n_i, n_j) * c(n_j) \quad (3)$$

where $c(\hat{n}_i)$ is the new count for the first N-gram $n_i$, $c(n_j)$ is the count for the second N-gram $n_j$, and $\text{sim}(n_i, n_j)$ is a representation of the similarity of the first N-gram to the second N-gram. Thus, the score of the second N-gram is weighted in a manner depending on how similar the second N-gram is to the first N-gram and the weighted score of the second N-gram is added to the score of the first N-gram. For example, if N-gram "abc" is determined to be similar to N-gram "bcc, a first score on an arc from N-gram "bc" that has an input label of c may be added to a second score from N-gram "ab" that has an input label of c.

As indicated by equation 3, the first N-gram may be boosted by the scores of a number of different N-grams (e.g., a third N-gram, fourth N-gram, etc.) depending on how similar those N-grams are to the first N-gram (which, as noted, may be determined based on how close the respective N-gram vector representations are to each other). As such boosted N-gram scores may grow unreasonably high, the boosted scores may be normalized as shown below:

$$c(\hat{n}_i) = c(n_i) + \Sigma_{n_j} \text{norm\_sim}(n_i, n_j) * c(n_j) \quad (4)$$

where $$\text{norm\_sim}(n_i, n_j) = \frac{\text{sim}(n_i, n_j)}{\sum_{n_j} \text{sim}(n_i, n_j)}.$$

To avoid high frequency N-grams from dominating the scores, the system may only combine N-gram scores for N-grams that are sufficiently similar to each other, i.e., when $\text{sim}(n_i, n_j)$>threshold. That similarity may be determined based on the distance between the vector representations of the respective N-grams.

By way of example, assume a first N-gram "I like to" is determined to be similar to a second N-gram "I want to." The first N-gram may be represented by a first state in an FST. That state may have an outgoing first arc with the output label of the word "run." That first arc may have a first score, representing how often in the training set the word "run" is found after the N-gram "I like to." The second N-gram, may have a count determined from how often the word string "I want to" appears in the text corpus. That count may be weighted based on how similar the second N-gram is from the first N-gram. That weighted count may be added to the first score (and then possibly normalized) to create an adjusted first score, where the adjusted first score is greater than the original first score. That adjusted first score may then take the place of the original first score as being the score for the first arc. Now the system may be more likely to traverse from the state representing the first N-gram along the arc with the output label of "run." If the first N-gram is also similar to a third N-gram (such as "I need to"), the count of the third N-gram may be weighted based on how similar the third N-gram is from the first N-gram and that further weighted count may also be added to the first score (and then possibly normalized) to create the adjusted first score (which in the example of also including the third N-gram, would be the first score plus the weighted count of the second N-gram and the weighted count of the third N-gram, and possibly normalized). In order to update the scores, the system will update the score corresponding to the first N-gram in the corresponding entry in a table of arcs (where the arc is outgoing from the state for the first N-gram). Thus the score in entry will be changed to have the adjusted first score, which incorporates the weighted scores from the N-gram(s) that are similar to the first N-gram.

While the above examples discuss adjusting scores of certain N-grams in the context of FSTs, similar score adjustments may also be made for other language model constructions where N-grams are used As noted above, in an N-gram model back off is used when the higher history N-gram was not seen with the next word in the text corpus used to create the N-gram model (e.g., FST). For example, when calculating $p(w_3|w_2, w_1)$, $w_1$, $w_2$, $w_3$ was not seen in the text corpus but $w_2$, $w_3$ was seen. However, by reducing the context size (e.g., from two to one) the system may make a worse estimate of the probability of the next word than if context can be maintained. To maintain this context, the similarity of the N-grams may be used to create new arcs in an existing FST, thus enabling the system at run time to avoid backing off from a larger N-gram to a smaller N-gram, and rather allowing the system to back off from a large N-gram, to a different, but similarly used N-gram, of a similar size. In this manner, the system can back off to a state that can predict the next word without changing the context size.

Figure 10:
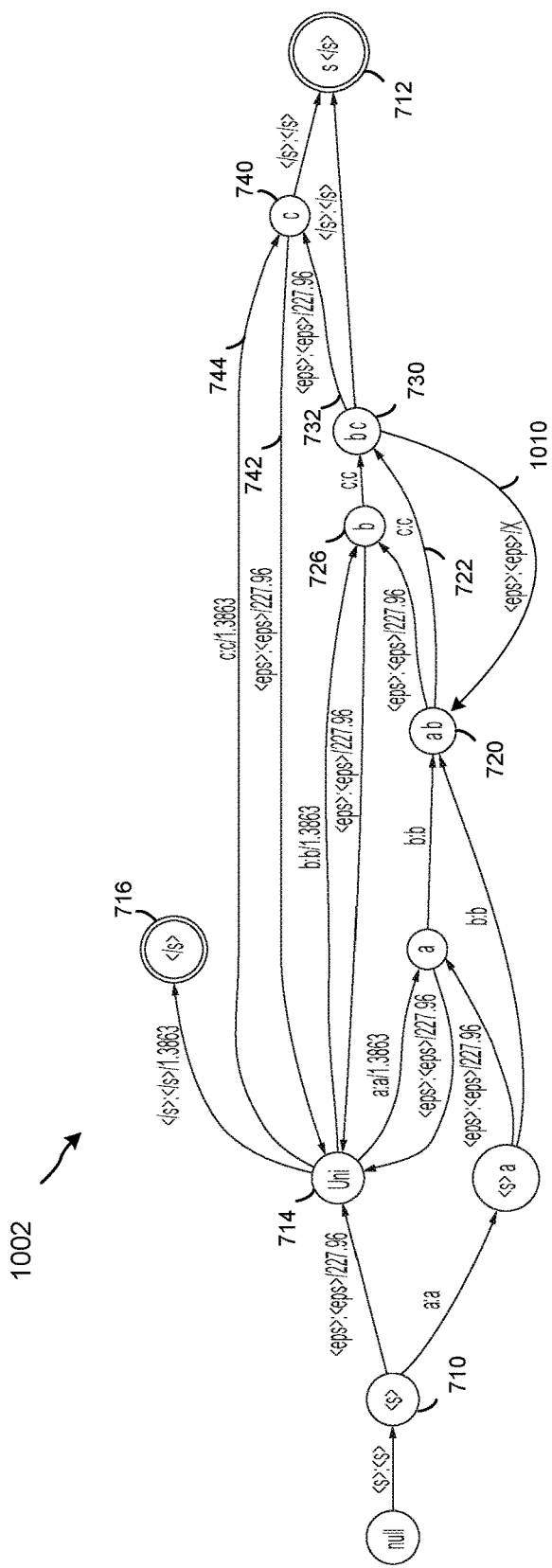
FIG. 10 illustrates a section of a finite state transducer according to embodiments of the present disclosure.

To allow the back off between similar N-grams at runtime, an existing FST may be altered to include an arc from a first N-gram to a second N-gram, where those N-grams have been determined to be similar to each other. For example, for FST 702, if N-gram "abc" is determined to be similar to N-gram "bcc" an arc may be created outgoing from state 730 to state 720, thus allowing backoff from state 730 to state 720. This new arc is shown in FIG. 10 where adjusted FST 1002 includes the new arc 1010. (For purposes of illustration, the remainder of FST 1002 remains the same as FST 702 whereas in practice the weights of existing arcs may also change in the adjusted FST due to N-gram similarities as explained above.) As shown, arc 1010 is labeled "<eps>: <eps>/X" meaning that arc 1010 it has null input and output labels (allowing it to be traversed for backoff) and a weight of X where the weight X is determined based on a similarity between N-gram "ab" and N-gram "bc." As noted above, the similarity may be based on a distance (or difference) between the individual vectors representations of N-gram bc and ab.

The new arc 1010 may be traversed when the system is at state 730 and needs to back off to output a particular next word, and now can back off to state 720 for bigram "ab" instead of all the way to the Uni state 714. For example, if the sentence to be output is "bcc" and the system has already traversed FST 1002 up to state 730 (which has resulted thusfar in output of words "bc", the system may traverse new arc 1010 to arrive at state 720 and then traverse arc 722 that has the input label of "c" and output label of "c," thus completing the desired output of "bcc" without having to backoff to unigram state 714. The system may then traverse to end state 712 to complete processing of the sentence "bcc."

To actually create the new arc, the system may adjust a state entry in a table of states of the FST, where the state entry corresponds to the N-gram state from which the new arc will depart. The system may also add a new entry in a table of arcs of the FST, where the new arc entry indicates the score of the new arc as well as the state corresponding to the N-gram state that is the destination of the new arc. In the example of FIG. 10, the table of arcs for the original FST 702 may be altered to include a new entry for arc 1010, where the new entry includes a score and an index to the state table for state 720 (which is the destination state of the new arc). Further, an entry in the state table for state 730 may be altered to include an index to the entry of new arc in the table of arcs. Thus the new updated FST 1002 may be represented by the updated table of states and table of arcs.

To enable the arc between the N-grams, the two N-grams must be similar, that is the history of the backed-off-to N-gram should be similar to the base history N-gram $w_2$, $w_1$ (i.e., $\text{sim}(n_i, n_j)$>threshold) and the history N-gram should have a high probability of being seen with $w_3$. As an example, for the sentence "I like to run" the system may calculate p(run|I like to). However, if the N-gram "I like to run" was not in the text corpus (and thus no arc for the word "run" is outgoing from the state for N-gram "I like to"), the system may back off to a shorter N-gram. If, however, the system could back off to p(run|I want to) because the N-gram "I like to" is similar to the N-gram "I want to," performance of the system may be improved.

Thus, the set of back off N-grams for a particular N-gram $n_i$, may be represented as:

$$\text{set}(n_i) = n_j \forall n_j | \text{count}(w_k: c(n_j, w_k) > 0) > t_1, \text{sim}(n_i, n_j) > t_2 \quad (5)$$

where $w_k$ is a word in the training set. Thus Equation 5 establishes that a particular word $w_k$ must appear in the training set a certain number of times (above threshold $t_1$) to avoid backing off to an N-gram that rarely appears in the training set. Further, the similarity between N-gram $n_i$ and $n_j$ should be greater than threshold $t_2$. The back off weight for N-grams in the set set($n_i$) may be calculated by assigning some mass from it:

$$\gamma(\hat{n}_i) = \lambda \cdot \gamma(n_i) \tag{6}$$

$$\gamma(n_j, n_i) = (1-\lambda) \cdot \gamma(n_i) \cdot \text{norm\_sim}(n_i, n_j) \tag{7}$$

where $\gamma(n_i)$ is the original back off probability for history $n_i$ and $\gamma(n_j, n_i)$ is the back off probability for N-grams in the set set($n_i$) and $\lambda$ is a parameter that determines how much probability mass is assigned to backing off to the lower N-gram versus how much probability mass is assigned to backing off to the set set($n_i$) of similar N-grams. The value of $\lambda$ may be chosen to reduce perplexity. Thus the score for the new arc (for example, score X of arc 1010 in FIG. 10) may be calculated using Equation 7 above.

Figure 11:
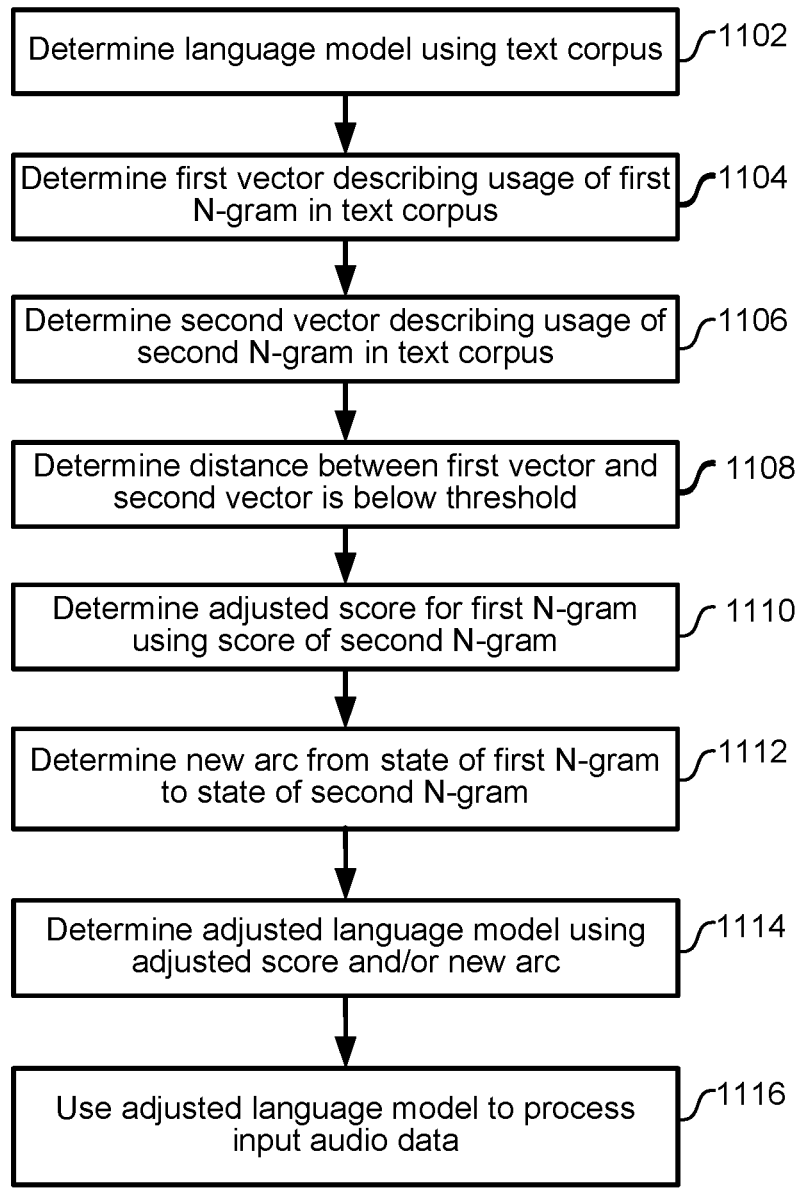
FIG. 11 illustrates a method for configuring a finite state transducer according to embodiments of the present disclosure.

As shown in FIG. 11, the system may determine (1102) a language model using a text corpus 180. The system may then determine (1104) a first vector describing how a first N-gram is used in the text corpus. The system may determine (1106) a second vector describing how a second N-gram is used in the text corpus. The system may determine (1108) that a distance between the first vector and second vector is below a threshold. The system may then determine (1110) an adjusted score for the first N-gram using the score of the second N-gram (for example by adding the old score of the first N-gram to a weighted score of the second N-gram). The system may also determine (1112) a new arc in a language model FST where the new arc goes from a first state representing the first N-gram to a second state representing the second N-gram. The system may then determine (1114) an adjusted language model (e.g., FST) where the adjusted language model includes the adjusted score and the new arc. The system may then use (1116) the adjusted language model (e.g., traverse the adjusted FST) to process input audio data as part of ASR.

Figure 12:
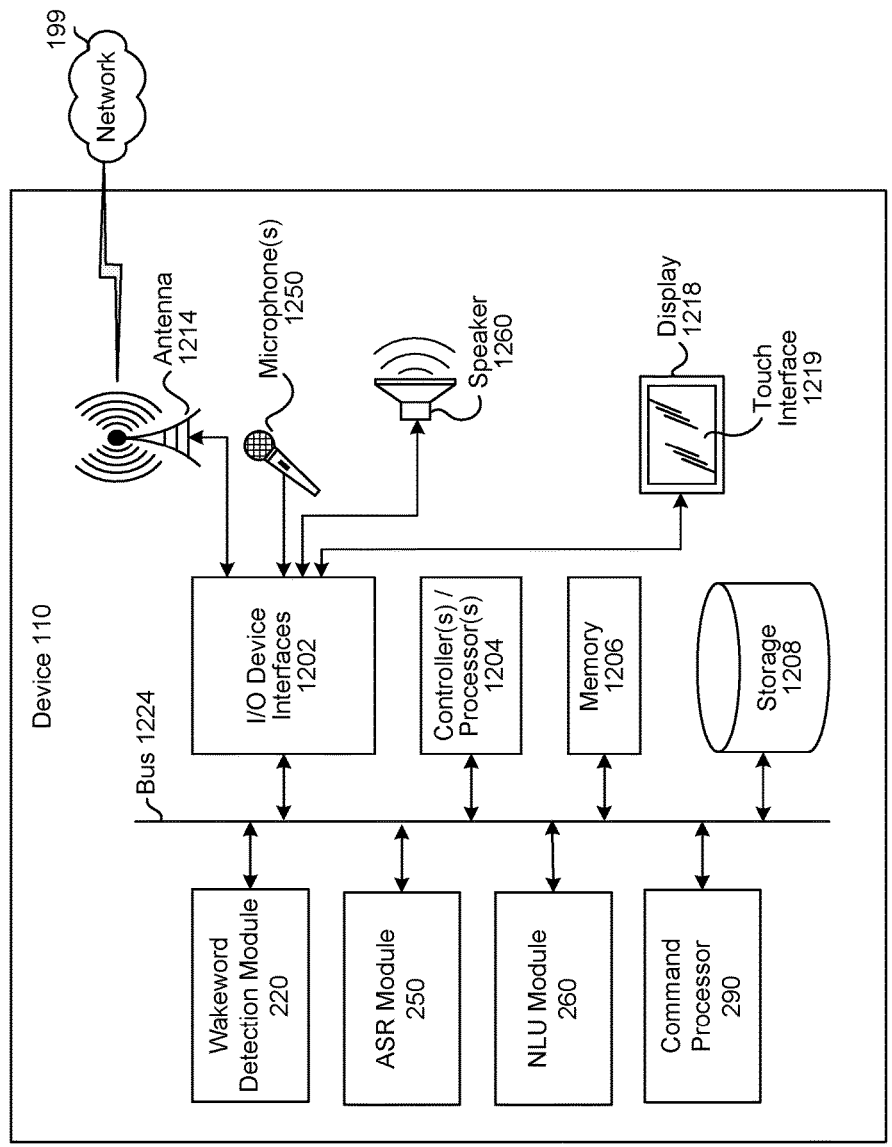
FIG. 12 is a block diagram conceptually illustrating example components of a device according to embodiments of the present disclosure.
Figure 13:
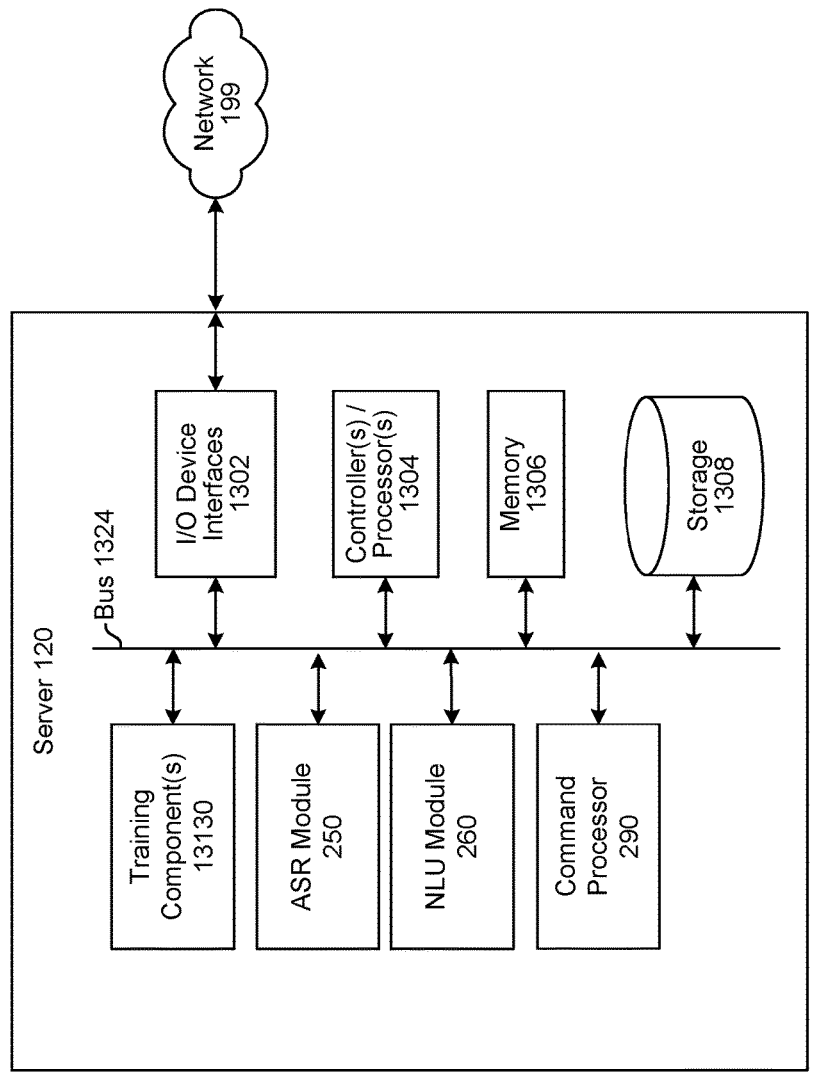
FIG. 13 is a block diagram conceptually illustrating example components of a server according to embodiments of the present disclosure.

FIG. 12 is a block diagram conceptually illustrating a local device 110 that may be used with the described system. FIG. 13 is a block diagram conceptually illustrating example components of a remote device, such as a remote server 120 that may assist with ASR, NLU processing, or command processing. Multiple such servers 120 may be included in the system, such as one server(s) 120 for training ASR models, one server(s) for performing ASR, one server(s) 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (1204/1304), that may each include a central processing unit (CPU) for processing data and computer-readable instructions, and a memory (1206/1306) for storing data and instructions of the respective device. The memories (1206/1306) may individually include volatile random access memory (RAM), non-volatile read only memory (ROM), non-volatile magnetoresistive (MRAM) and/or other types of memory. Each device may also include a data storage component (1208/1308), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (1202/1302).

Computer instructions for operating each device (110/120) and its various components may be executed by the respective device's controller(s)/processor(s) (1204/1304), using the memory (1206/1306) as temporary "working" storage at runtime. A device's computer instructions may be stored in a non-transitory manner in non-volatile memory (1206/1306), storage (1208/1308), or an external device(s). Alternatively, some or all of the executable instructions may be embedded in hardware or firmware on the respective device in addition to or instead of software.

Each device (110/120) includes input/output device interfaces (1202/1302). A variety of components may be connected through the input/output device interfaces, as will be discussed further below. Additionally, each device (110/120) may include an address/data bus (1224/1324) for conveying data among components of the respective device. Each component within a device (110/120) may also be directly connected to other components in addition to (or instead of) being connected to other components across the bus (1224/1324).

Referring to the device 110 of FIG. 12, the device 110 may include a display 1218, which may comprise a touch interface 1219. Or the device 110 may be "headless" and may primarily rely on spoken commands for input. As a way of indicating to a user that a connection between another device has been opened, the device 110 may be configured with a visual indicator, such as an LED or similar component (not illustrated), that may change color, flash, or otherwise provide visual indications by the device 110. The device 110 may also include input/output device interfaces 1202 that connect to a variety of components such as an audio output component such as a speaker 1260, a wired headset or a wireless headset (not illustrated) or other component capable of outputting audio. The device 110 may also include an audio capture component. The audio capture component may be, for example, a microphone 1250 or array of microphones, a wired headset or a wireless headset (not illustrated), etc. The microphone 1250 may be configured to capture audio. If an array of microphones is included, approximate distance to a sound's point of origin may be performed acoustic localization based on time and amplitude differences between sounds captured by different microphones of the array. The device 110 (using microphone 1250, wakeword detection module 220, ASR module 250, etc.) may be configured to determine audio data corresponding to detected audio data. The device 110 (using input/output device interfaces 1202, antenna 1214, etc.) may also be configured to transmit the audio data to server 120 for further processing or to process the data using internal components such as a wakeword detection module 220.

For example, via the antenna(s), the input/output device interfaces 1202 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

The device 110 and/or server 120 may include an ASR module 250. The ASR module in device 110 may be of limited or extended capabilities. The ASR module 250 may include the language models 254 stored in ASR model storage component 252, and a ASR engine 258 that performs the automatic speech recognition process. If limited speech recognition is included, the ASR module 250 may be configured to identify a limited number of words, such as keywords detected by the device, whereas extended speech recognition may be configured to recognize a much larger range of words.

The device 110 and/or server 120 may include a limited or extended NLU module 260. The NLU module in device 110 may be of limited or extended capabilities. The NLU module 260 may comprising the named entity recognition module 262, the intent classification module 264 and/or other components. The NLU module 260 may also include a stored knowledge base and/or entity library, or those storages may be separately located.

The device 110 and/or server 120 may also include a command processor 290 that is configured to execute commands/functions associated with a spoken command as described above.

The device 110 may include a wakeword detection module 220, which may be a separate component or may be included in an ASR module 250. The wakeword detection module 220 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 110 may be configured collectively to identify a set of the directional audio signals in which the wake expression is detected or in which the wake expression is likely to have occurred.

The wakeword detection module 220 receives captured audio and processes the audio (for example, using model(s) 232) to determine whether the audio corresponds to particular keywords recognizable by the device 110 and/or system 100. The storage 1208 may store data relating to keywords and functions to enable the wakeword detection module 220 to perform the algorithms and methods described above. The locally stored speech models may be pre-configured based on known information, prior to the device 110 being configured to access the network by the user. For example, the models may be language and/or accent specific to a region where the user device is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 110 prior to the user device 110 being delivered to the user or configured to access the network by the user. The wakeword detection module 220 may access the storage 1208 and compare the captured audio to the stored models and audio sequences using audio comparison, pattern recognition, keyword spotting, audio signature, and/or other audio processing techniques.

The server may also include a training component 1370 for training or creating various functions, models, classifiers, FSTs, or other such items discussed above. Various machine learning techniques may be used to perform various steps in determining how to weigh incoming features to a function or model used to adjust the ASR processors at runtime. Models/functions may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

As noted above, multiple devices may be employed in a single speech processing system. In such a multi-device system, each of the devices may include different components for performing different aspects of the speech processing. The multiple devices may include overlapping components. The components of the devices 110 and server 120, as illustrated in FIGS. 12 and 13, are exemplary, and may be located a stand-alone device or may be included, in whole or in part, as a component of a larger device or system.

Figure 14:
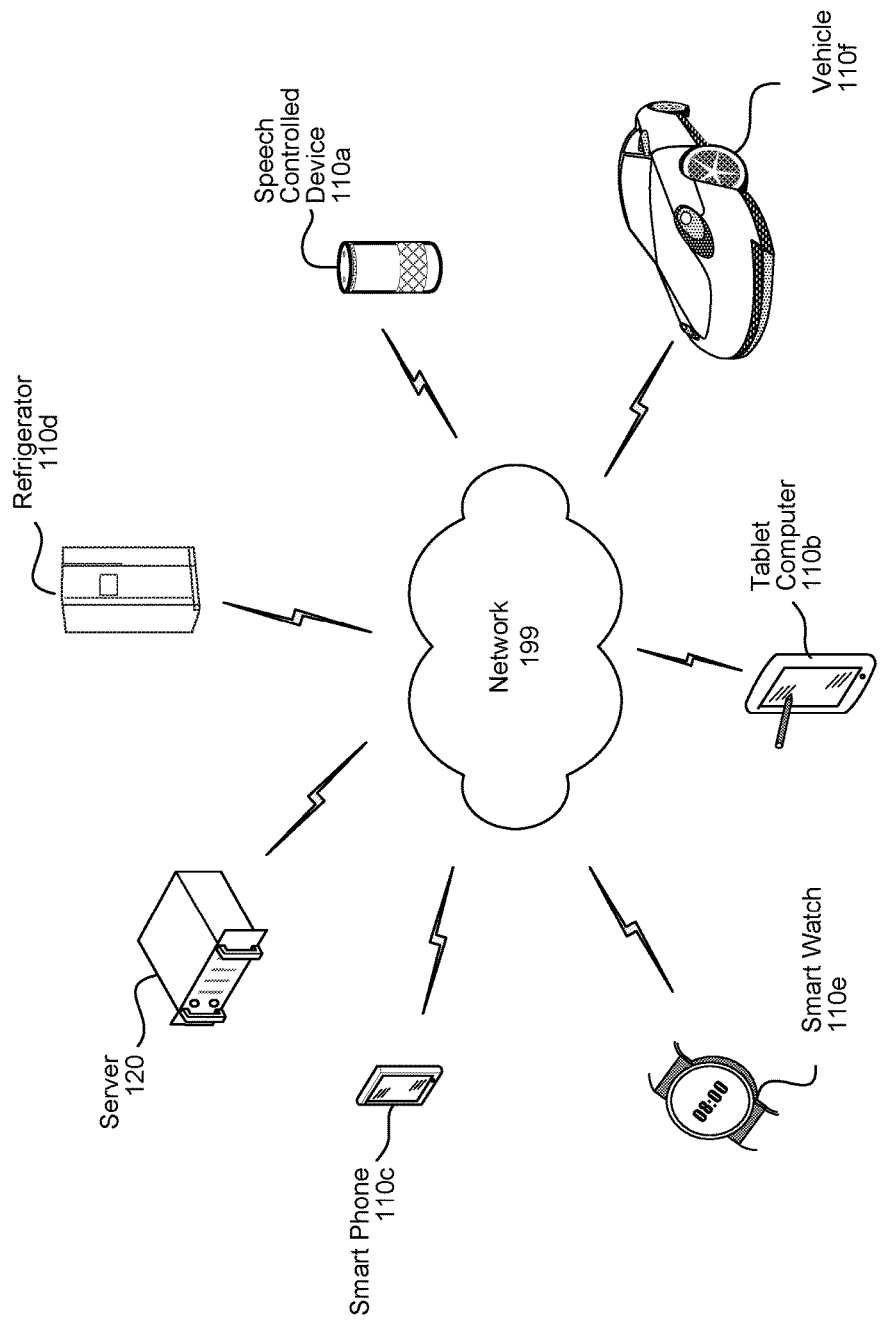
FIG. 14 illustrates an example of a computer network for use with the system.

As illustrated in FIG. 14 multiple devices (120, 120x, 110a to 110f) may contain components of the system 100 and the devices may be connected over a network 199. Network 199 may include a local or private network or may include a wide network such as the internet. Devices may be connected to the network 199 through either wired or wireless connections. For example, a speech controlled device 110a, a tablet computer 110b, a smart phone 110c, a refrigerator 110d, a smart watch 110e, and/or a vehicle 110f may be connected to the network 199 through a wireless service provider, over a WiFi or cellular network connection or the like. Other devices are included as network-connected support devices, such as a server 120, application developer devices 120x, or others. The support devices may connect to the network 199 through a wired connection or wireless connection. Networked devices 110 may capture audio using one-or-more built-in or connected microphones 1250 or audio capture devices, with processing performed by ASR, NLU, or other components of the same device or another device connected via network 199, such as an ASR 250, NLU 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented as in firmware or hardware, such as the acoustic front end 256, which comprise among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving audio data;
   determining first text data corresponding to the audio data, the first text data including a first word sequence and a next word following the first word sequence;
   determining, using a language model having data for a plurality of states, where each state of the plurality of states corresponds to a respective word sequence, a first state, of the plurality of states, corresponding to the first word sequence;
   determining, using the language model, that no second state of the language model following the first state corresponds to the next word;
   determining, using the language model, a first score corresponding to a similarity between use of the first word sequence in a text corpus and use of a second word sequence in the text corpus;
   determining, based on determining that no second state following the first state corresponds to the next word and based on the first score, second text data by replacing the first word sequence in the first text data with the second word sequence; and
   determining output text data corresponding to the audio data, the output text data including the second text data.

2. The computer-implemented method of claim 1, wherein:
   the language model comprises a finite state transducer (FST);
   the first score corresponds to an arc outgoing from a first node in the FST to a second node in the FST, the first node corresponding to the first word sequence and the second node corresponding to the second word sequence; and
   the first score represents a measurement of the similarity between use of the first word sequence and use of the second word sequence.

3. The computer-implemented method of claim 2, further comprising:
   processing the audio data using an acoustic model to output an acoustic score corresponding to an acoustic unit;
   processing the acoustic score to obtain a word score corresponding to a first word in the first word sequence;
   determining an adjusted score for the arc using the first score and the word score;
   selecting a second arc outgoing from the first node to a third node in the FST, the third node corresponding to the first word, the second arc comprising a second score; and
   determining a second adjusted score for the second arc using the second score and the word score.

4. The computer-implemented method of claim 1, wherein the first score is based on a difference between a first vector representing how the first word sequence is used in the text corpus and a second vector representing how the second word sequence is used in the text corpus.

5. The computer-implemented method of claim 4, wherein:
   the first vector is determined by processing the text corpus using a neural network language model, the neural network language model being trained using training text and indicators of word sequence validity.

6. The computer-implemented method of claim 4, wherein:
   the first score is based on a result of a second score plus a third score;
   the second score is based on a first measurement of a frequency of occurrence of the first word sequence in the text corpus; and
   the third score is based on the difference between the first vector and the second vector and a second measurement of a frequency of occurrence of the second word sequence in the text corpus.

7. The computer-implemented method of claim 6, wherein:
   the first score is further based on a fourth score plus the second score plus the third score; and
   the fourth score is based on a second difference between the first vector and a third vector representing a third usage of a third word sequence in the text corpus and a third measurement of a frequency of occurrence of the third word sequence in the text corpus.

8. The computer-implemented method of claim 1, wherein the first word sequence comprises a same number of words as the second word sequence.

9. A computing system, comprising:
at least one processor;
at least one memory including instructions that, when executed by the at least one processor, cause the system to:
receive audio data;
determine first text data corresponding to-the audio data, the first text data including a first word sequence and a next word following the first word sequence;
determine, using a language model having data for a plurality of states, where each state of the plurality of states corresponds to a respective word sequence, a first state of the plurality of states corresponding to the first word sequence;
determine, using the language model, that no second state of the language model following the first state corresponds to the next word;
determining, using the language model, a first score corresponding to a similarity between use of the first word sequence in a text corpus and use of a second word sequence in the text corpus; and
determine, based on determining that no second state following the first state corresponds to the next word and based on the first score, second text data by replacing the first word sequence in the first text data with the second word sequence; and
determine output text data corresponding to the audio data, the output text data including the second text data.

10. The computing system of claim 9, wherein:
the language model comprises a finite state transducer (FST);
the first score corresponds to an arc outgoing from a first node in the FST to a second node in the FST, the first node corresponding to the first word sequence and the second node corresponding to the second word sequence; and
the first score represents a measurement of the similarity between use of the first word sequence and use of the second word sequence.

11. The computing system of claim 10, wherein the memory includes further instructions that further configure the computing system to:
process the audio data using an acoustic model to output an acoustic score corresponding to an acoustic unit;
process the acoustic score to obtain a word score corresponding to a first word in the first word sequence;
determine an adjusted score for the arc using the first score and the word score;
select a second arc outgoing from the first node to a third node in the FST, the third node corresponding to the first word, the second arc comprising a second score; and
determine a second adjusted score for the second arc using the second score and the word score.

12. The computing system of claim 9, wherein the first score is based on a difference between a first vector representing how the first word sequence is used in the text corpus and a second vector representing how the second word sequence is used in the text corpus.

13. The computing system of claim 12, wherein:
the first vector is determined by processing the text corpus using a neural network language model, the neural network language model being trained using training text and indicators of word sequence validity.

14. The computing system of claim 12, wherein:
the first score is based on a result of a second score plus a third score;
the second score is based on a first measurement of a frequency of occurrence of the first word sequence in the text corpus; and
the third score is based on the difference between the first vector and the second vector and a second measurement of a frequency of occurrence of the second word sequence in the text corpus.

15. The computing system of claim 14, wherein:
the first score is further based on a fourth score plus the second score plus the third score; and
the fourth score is based on a second difference between the first vector and a third vector representing a third usage of a third word sequence in the text corpus and a third measurement of a frequency of occurrence of the third word sequence in the text corpus.

16. The computing system of claim 9, wherein the first word sequence comprises a same number of words as the second word sequence.

* * * * *